United States Patent
Brown et al.

(10) Patent No.: US 11,013,248 B2
(45) Date of Patent: May 25, 2021

(54) SHELF STABLE, CONCENTRATED, LIQUID FLAVORINGS AND METHODS OF PREPARING BEVERAGES WITH THE CONCENTRATED LIQUID FLAVORINGS

(71) Applicant: Kraft Food Group Brands LLC, Chicago, IL (US)

(72) Inventors: Dana Marie Brown, Santa Monica, CA (US); Karl Ragnarsson, Buffalo Grove, IL (US)

(73) Assignee: Kraft Foods Group Brands LLC, Chicago, IL (US)

(*) Notice: Subject to any disclaimer, the term of this patent is extended or adjusted under 35 U.S.C. 154(b) by 183 days.

(21) Appl. No.: 13/838,849

(22) Filed: Mar. 15, 2013

(65) Prior Publication Data

US 2013/0316066 A1    Nov. 28, 2013

Related U.S. Application Data

(60) Provisional application No. 61/651,958, filed on May 25, 2012.

(51) Int. Cl.
  *A23L 2/56* (2006.01)
  *A23L 2/385* (2006.01)
  (Continued)

(52) U.S. Cl.
  CPC .............. *A23L 2/56* (2013.01); *A23L 2/385* (2013.01); *A23L 27/88* (2016.08); *B01F 3/0865* (2013.01);
  (Continued)

(58) Field of Classification Search
  CPC ........... A32L 2/56; A32L 2/385; A32L 27/88; A32L 33/105; A32L 2/00; B01F 15/0203;
  (Continued)

(56) References Cited

U.S. PATENT DOCUMENTS 1,891,383 A   12/1932   Giffen
1,955,864 A   4/1934    Stevens
(Continued)

FOREIGN PATENT DOCUMENTS

CA   1169696   6/1984
CA   1243538   10/1988
(Continued)

OTHER PUBLICATIONS

Anonymous: "Packaging", LMS [Online] 2010, XP002630177, Retrieved from the Internet: URL: http://www.siliconelms.com/packaging.html> [retrieved Jan. 24, 2011] the whole document.
(Continued)

*Primary Examiner* — Nikki H. Dees
(74) *Attorney, Agent, or Firm* — Fitch, Even, Tabin & Flannery LLP

(57) ABSTRACT

Concentrated liquid flavorings and methods of preparing flavored beverages using the concentrated liquid flavorings are described herein. The concentrated liquid flavorings are shelf stable for prolonged storage times at ambient temperatures. Shelf stability is provided, at least in part, by acidic pH and/or reduced water activity. By one approach, the concentrated liquid flavorings are intended to provide flavor to a beverage, such as coffee, tea, milk, or other savory beverage. The concentrated liquid flavorings may be provided in a convenient portable and dosable format that can be easily used by a consumer to provide the desired flavor and amount of flavor to a beverage.

19 Claims, 9 Drawing Sheets

(51) Int. Cl.
  *B01F 15/02* (2006.01)
  *B01F 5/02* (2006.01)
  *B65D 47/20* (2006.01)
  *A23L 27/00* (2016.01)
  *B01F 3/08* (2006.01)

(52) U.S. Cl.
  CPC ............ *B01F 5/02* (2013.01); *B01F 15/0203* (2013.01); *B01F 15/0256* (2013.01); *B65D 47/2031* (2013.01)

(58) Field of Classification Search
  CPC .............. B01F 15/0256; B01F 3/0865; B65D 47/2031
  USPC ....................................................... 426/590
  See application file for complete search history.

(56) References Cited

U.S. PATENT DOCUMENTS

| | | |
|---|---|---|
| 2,764,486 A | 9/1956 | Stevens |
| 2,929,150 A | 3/1960 | Johnston |
| 2,977,231 A * | 3/1961 | Palley .................... A23F 5/243 222/394 |
| 3,234,138 A | 2/1966 | Carroll |
| 3,342,379 A | 9/1967 | Foley |
| 3,366,284 A | 1/1968 | Marona |
| 3,733,002 A | 5/1973 | Fujio |
| 3,852,483 A | 12/1974 | Oborsh |
| 3,949,098 A | 4/1976 | Bangert |
| 3,958,017 A | 5/1976 | Morse |
| 3,965,273 A | 6/1976 | Stahl |
| 3,996,386 A | 12/1976 | Malkki |
| 4,010,285 A | 3/1977 | Van |
| 4,124,151 A | 11/1978 | Hazard |
| 4,148,417 A | 4/1979 | Simmons |
| 4,199,605 A | 4/1980 | Eapen |
| 4,220,671 A | 9/1980 | Eapen |
| 4,234,611 A | 11/1980 | Kahn |
| 4,235,936 A | 11/1980 | Eapen |
| 4,322,407 A | 3/1982 | Ko |
| 4,358,032 A | 11/1982 | Libit |
| 4,423,029 A | 12/1983 | Rizzi |
| 4,497,835 A | 2/1985 | Winston |
| 4,551,342 A | 11/1985 | Nakel |
| 4,576,826 A | 3/1986 | Liu |
| 4,582,712 A | 4/1986 | Gonsalves |
| 4,582,715 A | 4/1986 | Volpenhein |
| 4,587,130 A | 5/1986 | Stauber |
| 4,608,266 A | 8/1986 | Epperson |
| 4,612,942 A | 9/1986 | Dobberstein |
| 4,619,833 A | 10/1986 | Anderson |
| 4,634,598 A | 1/1987 | Liu |
| 4,664,925 A | 5/1987 | McShane |
| 4,722,847 A | 2/1988 | Heckert |
| 4,732,773 A | 3/1988 | Schott |
| 4,737,375 A | 4/1988 | Nakel |
| 4,816,283 A | 3/1989 | Wade |
| 4,830,862 A | 5/1989 | Braun |
| 4,830,870 A | 5/1989 | Davis |
| 4,873,112 A | 10/1989 | Mitchell |
| 4,946,701 A | 8/1990 | Tsai |
| 4,971,797 A | 11/1990 | Cherukuri |
| H859 H | 12/1990 | Augustine |
| 4,992,282 A | 2/1991 | Mehansho |
| 5,002,779 A | 3/1991 | Mehansho |
| 5,013,447 A | 5/1991 | Lee |
| 5,032,387 A | 7/1991 | Hill |
| 5,032,411 A | 7/1991 | Stray-Gundersen |
| 5,033,655 A | 7/1991 | Brown |
| 5,069,924 A | 12/1991 | Baccus |
| 5,106,632 A | 4/1992 | Wong |
| 5,114,723 A | 5/1992 | Stray-Gundersen |
| 5,126,158 A | 6/1992 | Sharkasi |
| 5,141,758 A | 8/1992 | Monte |
| 5,153,019 A | 10/1992 | Hammond |
| 5,178,896 A | 1/1993 | Langner |
| 5,213,236 A | 5/1993 | Brown |
| 5,215,769 A | 6/1993 | Fox |
| 5,234,704 A | 8/1993 | Devine |
| 5,260,085 A | 11/1993 | Wisler |
| 5,271,531 A | 12/1993 | Rohr |
| 5,290,582 A | 3/1994 | Dressel |
| 5,310,570 A | 5/1994 | Kwapong |
| 5,330,654 A | 7/1994 | Humphrey |
| 5,336,510 A | 8/1994 | Chang |
| 5,339,995 A | 8/1994 | Brown |
| 5,346,639 A | 9/1994 | Hatfield |
| 5,373,991 A | 12/1994 | Nelson |
| 5,374,444 A | 12/1994 | Langner |
| 5,377,877 A | 1/1995 | Brown |
| 5,384,311 A | 1/1995 | Antenucci |
| 5,385,747 A | 1/1995 | Katz |
| 5,385,748 A | 1/1995 | Bunger |
| 5,387,431 A | 2/1995 | Fuisz |
| 5,390,805 A | 2/1995 | Bilani |
| 5,401,514 A | 3/1995 | Juch |
| 5,401,524 A | 3/1995 | Burkes |
| 5,405,624 A | 4/1995 | Doncheck |
| 5,405,756 A | 4/1995 | Naito |
| 5,417,994 A | 5/1995 | Chang |
| 5,424,082 A | 6/1995 | Dake |
| 5,433,965 A | 7/1995 | Fischer |
| 5,443,830 A | 8/1995 | Moore |
| 5,454,486 A | 10/1995 | Mack |
| 5,464,619 A | 11/1995 | Kuznicki |
| 5,472,716 A | 12/1995 | Kwapong |
| 5,474,791 A | 12/1995 | Zablocki |
| 5,474,793 A | 12/1995 | Meyer |
| 5,492,715 A | 2/1996 | Greenland |
| 5,498,429 A | 3/1996 | Orlandi |
| 5,500,232 A | 3/1996 | Keating |
| 5,503,863 A | 4/1996 | Brain |
| 5,516,535 A | 5/1996 | Heckert |
| 5,529,213 A | 6/1996 | Mack |
| 5,529,796 A | 6/1996 | Gobbo |
| 5,597,595 A | 1/1997 | Dewille |
| 5,605,230 A | 2/1997 | Marino |
| 5,607,707 A | 3/1997 | Ford |
| 5,609,897 A | 3/1997 | Chandler |
| 5,612,074 A | 3/1997 | Leach |
| 5,614,241 A | 3/1997 | Monte |
| 5,616,358 A | 4/1997 | Taylor |
| 5,626,262 A | 5/1997 | Fitten |
| 5,632,420 A | 5/1997 | Lohrman |
| 5,641,532 A | 6/1997 | Pflaumer |
| 5,681,569 A | 10/1997 | Kuznicki |
| 5,688,548 A | 11/1997 | Gaither |
| 5,690,984 A | 11/1997 | Lim |
| 5,698,222 A | 12/1997 | Mazer |
| 5,705,205 A | 1/1998 | Brunerie |
| 5,747,081 A | 5/1998 | Lee |
| 5,753,296 A | 5/1998 | Girsh |
| 5,756,141 A | 5/1998 | Chen |
| 5,780,086 A | 7/1998 | Kirksey |
| 5,792,502 A * | 8/1998 | Montezinos .................. 426/590 |
| 5,817,351 A | 10/1998 | DeWille |
| 5,833,123 A | 11/1998 | Gueret |
| 5,834,045 A | 11/1998 | Keating |
| 5,839,626 A | 11/1998 | Gross |
| 5,849,346 A | 12/1998 | Hornack |
| 5,855,948 A | 1/1999 | Mills |
| 5,866,190 A | 2/1999 | Barey |
| 5,888,563 A | 3/1999 | Mehansho |
| 5,897,033 A | 4/1999 | Okawa |
| 5,902,628 A | 5/1999 | Shamil |
| 5,919,511 A | 7/1999 | Hagiwara |
| 5,922,374 A | 7/1999 | Daury |
| 5,948,453 A | 9/1999 | Cerny |
| 5,965,183 A | 10/1999 | Hartal |
| 5,971,232 A | 10/1999 | Rohr |
| 5,980,959 A | 11/1999 | Frutin |
| 5,996,850 A | 12/1999 | Morali |
| 6,024,991 A | 2/2000 | Lehmberg |

(56) References Cited

U.S. PATENT DOCUMENTS

| | | | |
|---|---|---|---|
| 6,036,982 | A | 3/2000 | Lehmberg |
| 6,039,985 | A | 3/2000 | Kamarei |
| 6,039,987 | A | 3/2000 | Strahl |
| 6,041,975 | A | 3/2000 | Flak |
| 6,042,861 | A | 3/2000 | Anslow |
| 6,051,236 | A | 4/2000 | Portman |
| 6,080,431 | A | 6/2000 | Andon |
| 6,086,938 | A | 7/2000 | Sloot |
| 6,089,411 | A | 7/2000 | Baudin |
| 6,123,976 | A | 9/2000 | Stoddard |
| 6,126,981 | A | 10/2000 | Lee |
| 6,132,787 | A | 10/2000 | Bunger |
| 6,139,890 | A | 10/2000 | Simpukas |
| 6,139,895 | A | 10/2000 | Zablocki |
| 6,152,324 | A | 11/2000 | Baudin |
| 6,168,821 | B1 | 1/2001 | Castleberry |
| 6,180,130 | B1 | 1/2001 | Chen |
| 6,187,336 | B1 | 2/2001 | Okumura |
| 6,210,719 | B1 * | 4/2001 | de Lang ................ A23C 21/02 426/34 |
| 6,230,940 | B1 | 5/2001 | Manning |
| 6,238,672 | B1 | 5/2001 | Chen |
| 6,242,030 | B1 | 6/2001 | Oreilly |
| 6,245,373 | B1 | 6/2001 | Baron |
| 6,265,012 | B1 | 7/2001 | Shamil |
| 6,274,187 | B1 | 8/2001 | Lehmberg |
| 6,277,426 | B1 | 8/2001 | Reust |
| 6,277,427 | B1 | 8/2001 | Husz |
| 6,315,160 | B1 | 11/2001 | Gaiser |
| 6,350,484 | B1 | 2/2002 | Ault |
| 6,376,005 | B2 | 4/2002 | Bunger |
| 6,386,404 | B1 | 5/2002 | Auer |
| H2027 | H | 6/2002 | Brown |
| 6,402,054 | B1 | 6/2002 | Prueter |
| 6,405,901 | B1 | 6/2002 | Schantz |
| 6,406,730 | B1 | 6/2002 | Banyard |
| 6,413,558 | B1 | 7/2002 | Weber |
| 6,413,561 | B1 | 7/2002 | Sass |
| 6,413,570 | B1 | 7/2002 | Lehmberg |
| 6,426,111 | B1 | 7/2002 | Hirsch |
| 6,444,253 | B1 | 9/2002 | Conklin |
| D463,744 | S | 10/2002 | Brozell |
| 6,460,781 | B1 | 10/2002 | Garcia |
| 6,461,652 | B1 | 10/2002 | Henry |
| 6,468,576 | B1 | 10/2002 | Sher |
| 6,482,465 | B1 | 11/2002 | Cherukuri |
| 6,534,108 | B2 | 3/2003 | Jimenez-Laguna |
| 6,550,646 | B1 | 4/2003 | Takahara |
| 6,551,646 | B1 | 4/2003 | Baker |
| 6,575,330 | B2 | 6/2003 | Rousselet |
| 6,589,581 | B1 | 7/2003 | Marks |
| 6,598,808 | B1 | 7/2003 | Garcia |
| 6,599,553 | B2 | 7/2003 | Kealey |
| 6,602,538 | B1 | 8/2003 | Watkins |
| 6,607,761 | B2 | 8/2003 | Henry |
| 6,616,012 | B2 | 9/2003 | Dark |
| 6,616,016 | B2 | 9/2003 | Hicks |
| 6,638,555 | B2 | 10/2003 | Bank |
| 6,663,019 | B2 | 12/2003 | Garcia |
| 6,667,068 | B2 | 12/2003 | Smith |
| 6,669,963 | B1 | 12/2003 | Kampinga |
| 6,669,973 | B1 | 12/2003 | Jolivet |
| 6,672,479 | B2 | 1/2004 | Shiraishi |
| 6,703,056 | B2 | 3/2004 | Mehansho |
| 6,705,492 | B2 | 3/2004 | Lowry |
| 6,706,309 | B1 | 3/2004 | Aftoora |
| 6,713,114 | B2 | 3/2004 | Klein |
| 6,719,963 | B2 | 4/2004 | Parker |
| 6,723,369 | B2 | 4/2004 | Burgess |
| 6,726,063 | B2 | 4/2004 | Stull |
| 6,749,879 | B2 | 6/2004 | Broz |
| 6,770,316 | B2 | 8/2004 | Jindra |
| 6,779,689 | B2 | 8/2004 | Flaig |
| 6,783,035 | B2 | 8/2004 | Garcia |
| 6,787,167 | B1 | 9/2004 | Stahl |
| 6,827,956 | B2 | 12/2004 | Hansa |
| 6,835,405 | B2 | 12/2004 | Merkt |
| 6,837,405 | B2 | 1/2005 | Rainey |
| 6,866,877 | B2 | 3/2005 | Clark |
| 6,867,233 | B2 | 3/2005 | Roselle |
| 6,911,223 | B2 | 6/2005 | Morello |
| 6,913,769 | B2 | 7/2005 | Oslick |
| 6,951,295 | B1 | 10/2005 | Gaus |
| 6,977,084 | B2 | 12/2005 | Bui |
| 6,989,171 | B2 | 1/2006 | Portman |
| 7,033,629 | B2 | 4/2006 | Koss |
| 7,037,539 | B2 | 5/2006 | Westphal |
| 7,052,725 | B2 | 5/2006 | Chang |
| 7,056,541 | B1 | 6/2006 | Stahl |
| 7,067,150 | B2 | 6/2006 | Farber |
| 7,094,437 | B2 | 8/2006 | Solorio |
| 7,094,751 | B2 | 8/2006 | Bringe |
| 7,108,879 | B2 | 9/2006 | Schur |
| 7,115,297 | B2 | 10/2006 | Stillman |
| 7,138,151 | B2 | 11/2006 | Calapini |
| 7,152,763 | B2 | 12/2006 | Stull |
| 7,160,565 | B2 | 1/2007 | Rifkin |
| 7,169,416 | B2 | 1/2007 | Koss |
| 7,205,018 | B2 | 4/2007 | Sherwood |
| 7,214,396 | B2 | 5/2007 | Rivier |
| D544,351 | S | 6/2007 | Dittmer |
| 7,258,883 | B2 | 8/2007 | Winniczuk |
| 7,267,832 | B2 | 9/2007 | Zeller |
| 7,398,900 | B2 | 7/2008 | Friedman |
| 7,402,327 | B2 | 7/2008 | Zhong |
| 7,422,761 | B2 | 9/2008 | Parente |
| 7,476,399 | B2 | 1/2009 | Tachdjian |
| D587,117 | S | 2/2009 | Crawford |
| 7,503,469 | B2 | 3/2009 | Bloom |
| D592,957 | S | 5/2009 | Davis |
| 7,550,163 | B2 | 6/2009 | Palpu |
| 7,553,509 | B2 | 6/2009 | Doerr |
| 7,560,123 | B2 | 7/2009 | Giordano |
| 7,566,463 | B2 | 7/2009 | Ayala |
| 7,572,471 | B2 | 8/2009 | Lee |
| 7,582,324 | B2 | 9/2009 | Blank |
| D601,899 | S | 10/2009 | Davis |
| D609,098 | S | 2/2010 | Almstead, Jr. |
| 7,681,750 | B2 | 3/2010 | Jackel |
| 7,731,066 | B2 | 6/2010 | Norris |
| 7,757,896 | B2 | 7/2010 | Carpenter |
| 7,767,238 | B2 | 8/2010 | Roy |
| 7,794,770 | B2 | 9/2010 | Sherwood |
| 7,799,363 | B2 | 9/2010 | Sherwood |
| 7,815,075 | B2 | 10/2010 | Simkins |
| 7,815,960 | B2 | 10/2010 | Quan |
| 7,842,326 | B2 | 11/2010 | Sherwood |
| 7,862,845 | B2 | 1/2011 | Magomet |
| 7,897,192 | B2 | 3/2011 | Sherwood |
| 7,906,160 | B2 | 3/2011 | Sherwood |
| 7,919,135 | B2 | 4/2011 | Nair |
| 7,923,552 | B2 | 4/2011 | Jackson |
| 7,927,645 | B2 | 4/2011 | Fletcher |
| 7,967,172 | B2 | 6/2011 | Albaum |
| 7,976,234 | B2 | 7/2011 | May |
| 7,985,429 | B2 | 7/2011 | Caswell |
| 8,003,145 | B2 | 8/2011 | Gutwein |
| 8,007,581 | B2 | 8/2011 | Scott |
| 8,007,851 | B2 | 8/2011 | Rosevear |
| 8,047,401 | B2 | 11/2011 | Holler |
| 8,128,955 | B2 | 3/2012 | Howard |
| 8,158,180 | B2 | 4/2012 | Reiss |
| 8,168,225 | B2 | 5/2012 | Giner |
| 8,202,561 | B2 | 6/2012 | Livaich |
| 8,227,006 | B2 | 7/2012 | Lee |
| 8,263,150 | B2 | 9/2012 | Graumlich |
| 8,293,299 | B2 | 10/2012 | Ragnarsson |
| 8,293,300 | B2 | 10/2012 | Zhong |
| 8,431,178 | B2 * | 4/2013 | Given et al. ................... 426/650 |
| 8,511,472 | B2 | 8/2013 | Dupuis |
| 8,603,557 | B2 | 12/2013 | deCleir |
| 8,628,690 | B2 | 1/2014 | Mora-Gutierrez |
| 8,727,244 | B2 | 5/2014 | Bernstein |
| 8,955,715 | B2 | 2/2015 | Kneer |

(56) References Cited

U.S. PATENT DOCUMENTS

| | | |
|---|---|---|
| 9,073,248 B2 | 7/2015 | Smith |
| 9,095,168 B2 * | 8/2015 | Juga ............... A23C 9/1542 |
| 2001/0002269 A1 | 5/2001 | Zhao |
| 2001/0008641 A1 | 7/2001 | Krotzer |
| 2001/0043976 A1 | 11/2001 | Oreilly |
| 2001/0053404 A1 | 12/2001 | Powrie |
| 2002/0005415 A1 | 1/2002 | DeLaforcade |
| 2002/0014499 A1 | 2/2002 | Bonningue |
| 2002/0039612 A1 | 4/2002 | Gambino |
| 2002/0079334 A1 | 6/2002 | Schantz |
| 2002/0081361 A1 | 6/2002 | Towb |
| 2002/0102345 A1 | 8/2002 | Ramirez |
| 2002/0132780 A1 | 9/2002 | Heisey |
| 2002/0182270 A1 | 12/2002 | Stier |
| 2002/0187221 A1 | 12/2002 | Tanaka |
| 2002/0197376 A1 | 12/2002 | Broz |
| 2002/0197379 A1 | 12/2002 | George |
| 2003/0008047 A1 | 1/2003 | Schroeder |
| 2003/0035875 A1 | 2/2003 | Dulebohn |
| 2003/0089735 A1 | 5/2003 | Iwatsubo |
| 2003/0096047 A1 | 5/2003 | Riha |
| 2003/0106910 A1 | 6/2003 | Hicks |
| 2003/0119909 A1 | 6/2003 | Stanislaus |
| 2003/0124200 A1 | 7/2003 | Stone |
| 2003/0124228 A1 | 7/2003 | Goto |
| 2003/0129282 A1 | 7/2003 | Solorio |
| 2003/0134007 A1 | 7/2003 | Donhowe |
| 2003/0170367 A1 | 9/2003 | Fairhurst |
| 2003/0203072 A1 | 10/2003 | Omahony |
| 2003/0206978 A1 | 11/2003 | Sherwood |
| 2003/0211214 A1 | 11/2003 | Riha |
| 2003/0224090 A1 | 12/2003 | Pearce |
| 2003/0228347 A1 | 12/2003 | Clark |
| 2004/0005277 A1 | 1/2004 | Willison |
| 2004/0009129 A1 | 1/2004 | Yang |
| 2004/0022921 A1 | 2/2004 | Lee |
| 2004/0086620 A1 | 5/2004 | Tobin |
| 2004/0091589 A1 | 5/2004 | Roy |
| 2004/0109932 A1 | 6/2004 | Chen |
| 2004/0115133 A1 | 6/2004 | Wermeling |
| 2004/0115329 A1 | 6/2004 | Tamiya |
| 2004/0146551 A1 | 7/2004 | Mannino |
| 2004/0151815 A1 | 8/2004 | Jensen |
| 2004/0197401 A1 | 10/2004 | Calton |
| 2004/0219265 A1 | 11/2004 | Purcell |
| 2004/0219274 A1 | 11/2004 | Cook |
| 2004/0253227 A1 | 12/2004 | Martin |
| 2004/0265472 A1 | 12/2004 | Corfman et al. |
| 2005/0031762 A1 | 2/2005 | Mc |
| 2005/0053696 A1 | 3/2005 | Akashe |
| 2005/0069616 A1 | 3/2005 | Lee |
| 2005/0074526 A1 | 4/2005 | Pearce |
| 2005/0095320 A1 | 5/2005 | Botteri |
| 2005/0100639 A1 | 5/2005 | Pearce |
| 2005/0106304 A1 | 5/2005 | Cook |
| 2005/0106305 A1 | 5/2005 | Abraham |
| 2005/0112239 A1 | 5/2005 | Rudin |
| 2005/0136169 A1 | 6/2005 | Haung |
| 2005/0170048 A1 | 8/2005 | Reynolds |
| 2005/0196511 A1 | 9/2005 | Garrity |
| 2005/0202109 A1 | 9/2005 | Palu |
| 2005/0233046 A1 | 10/2005 | Krawczyk |
| 2005/0233051 A1 | 10/2005 | Shen |
| 2005/0238779 A1 | 10/2005 | Isoya |
| 2005/0260291 A1 | 11/2005 | Palu |
| 2005/0276839 A1 | 12/2005 | Rifkin |
| 2006/0035981 A1 | 2/2006 | Mazzio |
| 2006/0051428 A1 | 3/2006 | Ayala |
| 2006/0068005 A1 | 3/2006 | Ross |
| 2006/0073190 A1 | 4/2006 | Carroll |
| 2006/0076370 A1 | 4/2006 | Etesse |
| 2006/0083824 A1 | 4/2006 | Manning |
| 2006/0088574 A1 | 4/2006 | Manning |
| 2006/0093705 A1 | 5/2006 | Mehansho |
| 2006/0099277 A1 | 5/2006 | Jewett |
| 2006/0099550 A1 | 5/2006 | Faasse |
| 2006/0113323 A1 | 6/2006 | Jones |
| 2006/0115570 A1 | 6/2006 | Guerrero |
| 2006/0115572 A1 | 6/2006 | Guerrero |
| 2006/0134300 A1 | 6/2006 | Newman |
| 2006/0172016 A1 | 8/2006 | Kohutiak |
| 2006/0204601 A1 | 9/2006 | Palu |
| 2006/0204633 A1 | 9/2006 | Moore |
| 2006/0228454 A1 | 10/2006 | Ackilli |
| 2006/0240148 A1 | 10/2006 | Nguyen |
| 2006/0240149 A1 | 10/2006 | Konkoly |
| 2006/0251590 A1 | 11/2006 | Redmond |
| 2006/0280840 A1 | 12/2006 | Robertson |
| 2006/0286259 A1 | 12/2006 | Hargreaves |
| 2007/0003640 A1 | 1/2007 | Hammerstone |
| 2007/0009641 A1 | 1/2007 | Erickson |
| 2007/0012719 A1 | 1/2007 | Holler |
| 2007/0014909 A1 | 1/2007 | Mai |
| 2007/0014910 A1 | 1/2007 | Altemueller |
| 2007/0026120 A1 | 2/2007 | Wight |
| 2007/0045356 A1 | 3/2007 | Foster |
| 2007/0054026 A1 | 3/2007 | Grenville |
| 2007/0059362 A1 | 3/2007 | Rau |
| 2007/0059409 A1 | 3/2007 | Catani |
| 2007/0059418 A1 | 3/2007 | Catani |
| 2007/0059421 A1 | 3/2007 | Catani |
| 2007/0092623 A1 | 4/2007 | Shimizu |
| 2007/0092624 A1 | 4/2007 | Iwasaki |
| 2007/0098820 A1 | 5/2007 | Bortlik |
| 2007/0102455 A1 | 5/2007 | Stark |
| 2007/0104849 A1 | 5/2007 | McClements |
| 2007/0114250 A1 | 5/2007 | Langseder |
| 2007/0116779 A1 | 5/2007 | Mazzio |
| 2007/0116823 A1 | 5/2007 | Prakash |
| 2007/0116828 A1 | 5/2007 | Prakash |
| 2007/0116838 A1 | 5/2007 | Prakash |
| 2007/0116839 A1 | 5/2007 | Prakash |
| 2007/0122507 A1 | 5/2007 | Palu |
| 2007/0141122 A1 | 6/2007 | Reulein |
| 2007/0141204 A1 | 6/2007 | Xiong |
| 2007/0144333 A1 | 6/2007 | Kawabata |
| 2007/0148321 A1 | 6/2007 | Ashida |
| 2007/0172511 A1 | 7/2007 | Harrison |
| 2007/0172569 A1 | 7/2007 | Chang |
| 2007/0178193 A1 | 8/2007 | Chang |
| 2007/0184152 A1 | 8/2007 | Pemble |
| 2007/0184177 A1 | 8/2007 | Harrison |
| 2007/0196539 A1 | 8/2007 | Yang |
| 2007/0212453 A1 | 9/2007 | Niness |
| 2007/0212460 A1 | 9/2007 | Inoue |
| 2007/0212468 A1 | 9/2007 | White |
| 2007/0218111 A1 | 9/2007 | Ehrenkranz |
| 2007/0218146 A1 | 9/2007 | Palu |
| 2007/0262092 A1 | 11/2007 | Tyski |
| 2007/0264312 A1 | 11/2007 | Skaggs |
| 2007/0271944 A1 | 11/2007 | Ryan |
| 2007/0275064 A1 | 11/2007 | Mumoli |
| 2007/0275125 A1 | 11/2007 | Catani |
| 2007/0275139 A1 | 11/2007 | Joerger |
| 2007/0275145 A1 | 11/2007 | Catani |
| 2007/0292483 A1 | 12/2007 | Rinaldi |
| 2007/0292582 A1 | 12/2007 | Prakash |
| 2007/0295763 A1 | 12/2007 | Brunner |
| 2007/0298078 A1 | 12/2007 | Harrison |
| 2007/0298083 A1 | 12/2007 | Mehansho |
| 2007/0298156 A1 | 12/2007 | Mehansho |
| 2007/0299133 A1 | 12/2007 | Mehansho |
| 2008/0020020 A1 | 1/2008 | Williamson |
| 2008/0020115 A1 | 1/2008 | Guerrero |
| 2008/0032009 A1 | 2/2008 | Priest |
| 2008/0038409 A1 | 2/2008 | Nair |
| 2008/0050472 A1 | 2/2008 | Heuer |
| 2008/0050500 A1 | 2/2008 | Muranishi |
| 2008/0058417 A1 | 3/2008 | Abril |
| 2008/0063765 A1 | 3/2008 | Barbano |
| 2008/0069939 A1 | 3/2008 | Catani |
| 2008/0075806 A1 | 3/2008 | Dorr |
| 2008/0085349 A1 | 4/2008 | Chen |
| 2008/0085351 A1 | 4/2008 | Lee |

(56) References Cited

U.S. PATENT DOCUMENTS

| | | |
|---|---|---|
| 2008/0089978 A1 | 4/2008 | Grigg |
| 2008/0107775 A1 | 5/2008 | Prakash |
| 2008/0107776 A1 | 5/2008 | Prakash |
| 2008/0108710 A1 | 5/2008 | Prakash |
| 2008/0138490 A1 | 6/2008 | Nash |
| 2008/0152777 A1 | 6/2008 | Cobos |
| 2008/0160077 A1 | 7/2008 | Borowy-Borowski |
| 2008/0175977 A1 | 7/2008 | Harrison |
| 2008/0193601 A1 | 8/2008 | Nasser |
| 2008/0193616 A1 | 8/2008 | Safko |
| 2008/0203114 A1 | 8/2008 | LaFlamme |
| 2008/0206376 A1 | 8/2008 | Palu |
| 2008/0213415 A1 | 9/2008 | Palu |
| 2008/0226758 A1 | 9/2008 | Deng |
| 2008/0226770 A1 | 9/2008 | Lee |
| 2008/0226773 A1 | 9/2008 | Lee |
| 2008/0226776 A1 | 9/2008 | Roy |
| 2008/0226789 A1 | 9/2008 | Roy |
| 2008/0226790 A1 | 9/2008 | Johnson |
| 2008/0226793 A1 | 9/2008 | Chang |
| 2008/0226794 A1 | 9/2008 | Bell |
| 2008/0226795 A1 | 9/2008 | May |
| 2008/0226796 A1 | 9/2008 | Lee |
| 2008/0226797 A1 | 9/2008 | Lee |
| 2008/0226798 A1 | 9/2008 | Talebi |
| 2008/0226800 A1 | 9/2008 | Lee |
| 2008/0226801 A1 | 9/2008 | May |
| 2008/0226802 A1 | 9/2008 | Lee |
| 2008/0226803 A1 | 9/2008 | Letourneau |
| 2008/0226804 A1 | 9/2008 | Talebi |
| 2008/0233056 A1 | 9/2008 | Berl |
| 2008/0241333 A1 | 10/2008 | Cina |
| 2008/0254174 A1 | 10/2008 | Dimitrijevic |
| 2008/0254188 A1 | 10/2008 | Borowy-Borowski |
| 2008/0271809 A1 | 11/2008 | Goldman |
| 2008/0280023 A1 | 11/2008 | Kalenian |
| 2008/0286414 A1 | 11/2008 | Mathisen |
| 2008/0286421 A1* | 11/2008 | DeLease ............... A23C 9/1524 426/112 |
| 2008/0292767 A1 | 11/2008 | Iwasaki |
| 2008/0299277 A1 | 12/2008 | Chao |
| 2008/0305096 A1 | 12/2008 | Verdegem |
| 2008/0317853 A1 | 12/2008 | Kashid |
| 2009/0004360 A1 | 1/2009 | Bingley |
| 2009/0011108 A1 | 1/2009 | Kogiso |
| 2009/0018186 A1 | 1/2009 | Chen |
| 2009/0022828 A1 | 1/2009 | Palu |
| 2009/0022856 A1 | 1/2009 | Cheng |
| 2009/0035229 A1 | 2/2009 | Eirew |
| 2009/0041897 A1 | 2/2009 | Gamay |
| 2009/0041911 A1 | 2/2009 | Gamay |
| 2009/0041914 A1 | 2/2009 | Rosevear |
| 2009/0047405 A1 | 2/2009 | Zhang |
| 2009/0053366 A1 | 2/2009 | Hurwitz |
| 2009/0074680 A1 | 3/2009 | Anderson |
| 2009/0074860 A1 | 3/2009 | Borba |
| 2009/0074927 A1 | 3/2009 | Bonorden |
| 2009/0074935 A1 | 3/2009 | Lee |
| 2009/0104312 A1* | 4/2009 | Kamarei ............... A23L 2/52 426/72 |
| 2009/0139882 A1 | 6/2009 | Dejonge |
| 2009/0143301 A1 | 6/2009 | Olson |
| 2009/0155446 A1 | 6/2009 | Reiss |
| 2009/0162484 A1 | 6/2009 | Bell |
| 2009/0162487 A1 | 6/2009 | Bell |
| 2009/0162488 A1 | 6/2009 | Bell |
| 2009/0181148 A1 | 7/2009 | Saggin |
| 2009/0191311 A1 | 7/2009 | Fukuda |
| 2009/0196955 A1 | 8/2009 | Akinruli |
| 2009/0200342 A1 | 8/2009 | Albaum |
| 2009/0232941 A1 | 9/2009 | Farmer |
| 2009/0232943 A1 | 9/2009 | Gamay |
| 2009/0280147 A1 | 11/2009 | Alberius |
| 2009/0280232 A1 | 11/2009 | Lee |
| 2009/0291163 A1 | 11/2009 | White |
| 2009/0297665 A1 | 12/2009 | Bromley |
| 2009/0298952 A1 | 12/2009 | Brimmer |
| 2009/0317532 A1 | 12/2009 | Bromley |
| 2010/0009052 A1 | 1/2010 | Canessa |
| 2010/0015288 A1 | 1/2010 | Fukuda |
| 2010/0028444 A1 | 2/2010 | Matuschek |
| 2010/0034894 A1 | 2/2010 | Szymczak |
| 2010/0040738 A1 | 2/2010 | Smith |
| 2010/0055248 A1 | 3/2010 | Woelfel |
| 2010/0055249 A1 | 3/2010 | Rivera |
| 2010/0055250 A1 | 3/2010 | Rivera |
| 2010/0089952 A1 | 4/2010 | Cleary |
| 2010/0092622 A1 | 4/2010 | Warner |
| 2010/0098821 A1 | 4/2010 | Comstock |
| 2010/0099753 A1 | 4/2010 | DeSaizieu |
| 2010/0099857 A1 | 4/2010 | Evans |
| 2010/0112130 A1 | 5/2010 | Abelyan |
| 2010/0136175 A1 | 6/2010 | Skiff |
| 2010/0143554 A1 | 6/2010 | Fukuda |
| 2010/0143573 A1 | 6/2010 | Godber |
| 2010/0166917 A1 | 7/2010 | Smith |
| 2010/0196549 A1 | 8/2010 | Rivera |
| 2010/0196577 A1 | 8/2010 | Rivera |
| 2010/0233322 A1 | 9/2010 | Fukuda |
| 2010/0247714 A1* | 9/2010 | Massey ............... A23F 3/163 426/78 |
| 2010/0255171 A1 | 10/2010 | Purkayastha |
| 2010/0278993 A1 | 11/2010 | Prakash |
| 2010/0285201 A1 | 11/2010 | Catani |
| 2010/0297305 A1 | 11/2010 | Nonaka |
| 2010/0298242 A1 | 11/2010 | Postges |
| 2010/0303971 A1 | 12/2010 | Melms |
| 2010/0323066 A1 | 12/2010 | Comstock |
| 2011/0008508 A1 | 1/2011 | Catani |
| 2011/0032788 A1 | 2/2011 | Hofte |
| 2011/0033597 A1 | 2/2011 | Bell |
| 2011/0059205 A1 | 3/2011 | Gaysinsky |
| 2011/0059219 A1 | 3/2011 | Wild |
| 2011/0097447 A1 | 4/2011 | Roy |
| 2011/0104353 A1 | 5/2011 | Lee |
| 2011/0142995 A1 | 6/2011 | Hinds |
| 2011/0151059 A1 | 6/2011 | Xu |
| 2011/0165307 A1 | 7/2011 | Denis |
| 2011/0166086 A1 | 7/2011 | Toyohara |
| 2011/0195169 A1 | 8/2011 | Markosyan |
| 2011/0195170 A1 | 8/2011 | Shigemura |
| 2011/0268847 A1 | 11/2011 | Yang |
| 2011/0290825 A1 | 12/2011 | Gordon |
| 2011/0311683 A1 | 12/2011 | Talebi |
| 2012/0018452 A1 | 1/2012 | Anliker |
| 2012/0080450 A1 | 4/2012 | Dziersk |
| 2012/0114800 A1 | 5/2012 | McKay |
| 2012/0114819 A1 | 5/2012 | Ragnarsson |
| 2012/0135124 A1 | 5/2012 | Letourneau |
| 2012/0211526 A1 | 8/2012 | Dupuis |
| 2012/0312839 A1 | 12/2012 | Stehli |
| 2012/0321745 A1* | 12/2012 | Juga ............... A23C 9/1542 426/61 |
| 2013/0040036 A1 | 2/2013 | Zeller |
| 2013/0048679 A1 | 2/2013 | Swanick |
| 2013/0064956 A1 | 3/2013 | Zeller |
| 2013/0175294 A1 | 7/2013 | Holden |
| 2013/0189399 A1 | 7/2013 | Ragnarsson |
| 2013/0270301 A1 | 10/2013 | Schoubben |
| 2013/0316066 A1 | 11/2013 | Brown |
| 2014/0017386 A1 | 1/2014 | Ragnarsson |
| 2014/0217130 A1 | 8/2014 | Ellenkamp-VanOlst |
| 2014/0374448 A1 | 12/2014 | Chen |
| 2015/0014369 A1 | 1/2015 | Hatton |
| 2015/0017289 A1 | 1/2015 | Greenberg |
| 2015/0203253 A1 | 7/2015 | Lee |
| 2015/0216723 A1 | 8/2015 | Yoshimura |
| 2015/0217911 A1 | 8/2015 | Wilson |
| 2015/0237905 A1 | 8/2015 | Ragnarsson |

FOREIGN PATENT DOCUMENTS

| | | |
|---|---|---|
| CA | 2146631 A1 | 4/1994 |
| CA | 2530106 | 1/2005 |

(56) References Cited

FOREIGN PATENT DOCUMENTS

| | | |
|---|---|---|
| CA | 2748983 | 3/2012 |
| CN | 101143018 | 3/2008 |
| CN | 100405936 | 7/2008 |
| CN | WO 2011036163 A1 * | 3/2011 ........... A23C 9/1542 |
| EP | 0011324 | 5/1980 |
| EP | 0040654 | 12/1981 |
| EP | 0162526 | 11/1985 |
| EP | 0198591 | 10/1986 |
| EP | 0202106 | 11/1986 |
| EP | 0416667 | 3/1991 |
| EP | 1994014328 | 1/1994 |
| EP | 0925727 | 6/1999 |
| EP | 1121868 | 8/2001 |
| EP | 1328165 | 7/2003 |
| EP | 1566373 | 8/2005 |
| EP | 1785042 | 5/2007 |
| EP | 1900295 | 3/2008 |
| EP | 1993387 | 11/2008 |
| EP | 2025364 | 2/2009 |
| EP | 2386211 | 11/2011 |
| EP | 2474240 | 7/2012 |
| EP | 2491801 | 8/2012 |
| EP | 2233051 | 5/2014 |
| ES | 2278993 | 8/2007 |
| FR | 2078627 | 11/1971 |
| GB | 965508 | 7/1964 |
| GB | 1114540 | 5/1968 |
| GB | 1326289 | 8/1973 |
| GB | 2207335 | 2/1989 |
| GB | 2298350 | 9/1996 |
| GB | 2398721 | 9/2004 |
| JP | S54143560 | 11/1979 |
| JP | S57118777 | 7/1982 |
| JP | 5016975 | 1/1993 |
| JP | H11503023 | 3/1999 |
| JP | 2000295976 A | 10/2000 |
| JP | 2003061575 | 3/2003 |
| JP | 2004043035 | 2/2004 |
| JP | 2004267041 | 9/2004 |
| JP | 2005075881 | 3/2005 |
| JP | 2005529194 | 9/2005 |
| JP | 2006000031 | 1/2006 |
| JP | 2009132465 | 6/2009 |
| JP | 2010521172 | 6/2010 |
| KR | 1020000076586 | 12/2000 |
| WO | 1994008473 | 4/1994 |
| WO | 1995011168 A1 | 1/1995 |
| WO | 1995018540 | 1/1995 |
| WO | 1996037120 | 2/1996 |
| WO | 1996011582 | 4/1996 |
| WO | 1996026649 | 9/1996 |
| WO | 1998056673 | 12/1998 |
| WO | 1999059425 | 2/1999 |
| WO | 1999059425 | 11/1999 |
| WO | 2000048161 A2 | 2/2000 |
| WO | 2000054838 | 2/2000 |
| WO | 2001001793 | 1/2001 |
| WO | 2001022836 | 1/2001 |
| WO | 2001039615 | 1/2001 |
| WO | 2003106292 | 2/2003 |
| WO | 2004023900 | 3/2004 |
| WO | 2004089805 | 10/2004 |
| WO | 2005020721 | 3/2005 |
| WO | 2005044025 | 5/2005 |
| WO | 2006097823 | 9/2006 |
| WO | 2006102435 | 9/2006 |
| WO | 2006109200 | 10/2006 |
| WO | 2006115414 | 11/2006 |
| WO | 2007053970 | 5/2007 |
| WO | 2007061795 | 5/2007 |
| WO | 2007084185 | 7/2007 |
| WO | 2007104774 | 9/2007 |
| WO | 2007144333 | 12/2007 |
| WO | 2008112852 | 9/2008 |
| WO | 2008112857 | 9/2008 |
| WO | 2008112961 | 9/2008 |
| WO | 2008113115 | 9/2008 |
| WO | 2008139725 | 11/2008 |
| WO | 2009086045 | 7/2009 |
| WO | 2009086049 | 7/2009 |
| WO | 2009140568 | 11/2009 |
| WO | 2010017433 | 2/2010 |
| WO | 2010067047 | 6/2010 |
| WO | 2010108951 | 9/2010 |
| WO | 2010142826 | 12/2010 |
| WO | 2011031985 | 3/2011 |
| WO | 2011037959 | 3/2011 |
| WO | 2011046423 | 4/2011 |
| WO | 2011089247 | 7/2011 |
| WO | 2011103378 | 8/2011 |
| WO | 2012024218 | 2/2012 |
| WO | 2012031120 | 3/2012 |
| WO | 2012069311 | 5/2012 |
| WO | 2012082587 | 6/2012 |
| WO | 2012082712 | 6/2012 |

OTHER PUBLICATIONS

Anonymous: "Products: Elastomeric Flow-Control Valves", LMS, [Online] 2010, XP002618885, Retrieved from the Internet: URL: http://www.siliconelms.com/products.html> [retrieved on Jan. 24, 2011] the whole document.
Anonymous: "SimpliSqueeze", LMS, [Online] 2010, XP002630176, Retrieved from the Internet: URL: http://www.siliconelms.com/simplisqueeze.html> [retrieved on Jan. 24, 2011] the whole document.
International Preliminary Report on Patentability and Written Opinion of the International Searching Authority in corresponding International application No. PCT/US2010/048449, dated Mar. 13, 2012, 13 pages.
International Search Report in corresponding International application No. PCT/US2010/048449, dated Jun. 29, 2011, 6 pages.
Capella Flavor Drops, Capella Flavors Inc., www.capellaflavordrops.com, this product was available at least as of Feb. 2011, 6 pages.
Da Fruta, Da Fruta, this product was available at least as of Jun. 2011, 3 pages.
Five photographs, Pur Water Filtration Systems.RTM. Flavor Options.TM., this product was available at least as of Aug. 2010, 5 pages.
Flavlet, Capella Flavors Inc., www.capellaflavordrops.com, this product was available at least as of Jun. 2011, 4 pages.
Flavrz, Flavrz Beverage Corp., http://www.flavrzdrinkmix.com, this product was available at least as of Jun. 2011, 3 pages.
Heath, Henry B., "Source Book of Flavors." Van Nostrand Reinhold, New York, 1981, 4 pages.
Menos es Menos, Coca Cola, this product was available at least as of Jun. 2011, 2 pages.
Partial European Search Report, European Patent Application No. 13169123.0, dated Feb. 25, 2014, 6 pages.
Pure Inventions, Pure Inventions.RTM., www.pureinventions.com, this product was available at least as of Apr. 2011, 15 pages.
Ribena, GlaxoSmithKline, this product was available at least as of Jun. 2011, 4 pages.
Robinson's, Britvic Soft Drinks, www.britvic.com, this product was available at least as of Jun. 2011, 3 pages.
Squeezy Squash, Bottle Green, this product was available at least as of Jun. 2011, 3 pages.
United States Statutory Invention Registration No. H1628, Ekanayake et al., Published Jan. 7, 1997, 7 pages.
Yum Drops, www.yumdropsflavoring.com, this product was available at least as of Feb. 2011, 9 pages.
"Full Body Shrink Sleeve" 2013, Gilbreth Shrink Sleeve Labels a Cenveio Company, <http://www.gilbrethusa.com/shrink-sleeve-glossary.html>, 3 pages.
"Shrink Sleeve Packaging in 4 Easy Steps." Gilbreth Packaging a Cenveo Company, 2011, 5 pages.
Alan J. Mitchell, Formulation and Production of Carbonated Soft Drinks (1990), part I (199 pgs.).
Alan J. Mitchell, Formulation and Production of Carbonated Soft Drinks (1990), part II (100 pgs.).

(56) References Cited

OTHER PUBLICATIONS

Alan J. Mitchell, Formulation and Production of Carbonated Soft Drinks (1990), part III (78 pgs.).
Anonymous: 'Packaging.' LMS, [Online] 2010, XP002630177, Retrieved from the Internet: URL:http://www.siliconelms.com/packaging.html>, [retrieved on Jan. 24, 2011], 1 page.
Anonymous: 'Products: Elastomeric Flow-Control Valves.' LMS, [Online] 2010, XP002618885, Retrieved from the Internet: URL:http://www.siliconelms.com/products.html>, [retrieved on Jan. 24, 2011], 1 page.
Anonymous: 'SimpliSqueeze.' LMS, [Online] 2010, XP002630176, Retrieved from the Internet: URL:http://www.siliconelms.com/simplisqueeze.html>, [retrieved on Jan. 24, 2011], 1 page.
C. Clark Westcott (1978) pH Measurements (1978) (183 pgs.).
Cheng, K.L., et al., "On Calibration of pH Meters." Sensors (Basel). Apr. 2005, vol. 5, No. 4, pp. 209-219.
Chinese Application No. 201380015006.X, Chinese First Office Action, dated Aug. 18, 2015, 11 pages (with English translation).
CRC Handbook of Food Additives, 2nd Edition, vol. II (1980), part I (99 pgs.).
CRC Handbook of Food Additives, 2nd Edition, vol. II (1980), part II (100 pgs.).
CRC Handbook of Food Additives, 2nd Edition, vol. II (1980), part III (100 pgs.).
CRC Handbook of Food Additives, 2nd Edition, vol. II (1980), part IV (100 pgs.).
CRC Handbook of Food Additives, 2nd Edition, vol. II (1980), part V (20 pgs.).
European Patent Application No. 13169123.0, Communication pursuant to Article 94(3) EPC, dated Mar. 10, 2016, 4 pages.
European Patent Application No. 13169123.0, Extended European Search Report and Opinion, dated Feb. 25, 2014, 6 pages.
Fang, Yapeng, et al., "Origin and Thermodynamic Properties of the Instability of Synthetic Azo Colorants in Gum Arabic Solutions." Journal of Agricultural and Food Chemistry, vol. 55, No. 22, 2007, pp. 9274-9282.
Furia, Thomas E., CRC Handbook of Food Additives, 2nd Edition, vol. II, CRC Press, Inc. (1980), Boca Raton, Florida, 5 pages.
Hach. "pH: Frequent Asked Questions." 2011, <www.hach.com>, 4 pages.
Henry B. Heath, Source Book of Flavors (1st ed. 1981), part I (99 pgs.).
Henry B. Heath, Source Book of Flavors (1st ed. 1981), part II (100 pgs.).
Henry B. Heath, Source Book of Flavors (1st ed. 1981), part III (100 pgs.).
Henry B. Heath, Source Book of Flavors (1st ed. 1981), part IV (100 pgs.).
Henry B. Heath, Source Book of Flavors (1st ed. 1981), part IX (86 pgs.).
Henry B. Heath, Source Book of Flavors (1st ed. 1981), part V (100 pgs.).
Henry B. Heath, Source Book of Flavors (1st ed. 1981), part VI (100 pgs.).
Henry B. Heath, Source Book of Flavors (1st ed. 1981), part VII (100 pgs.).
Henry B. Heath, Source Book of Flavors (1st ed. 1981), part VIII (100 pgs.).
Kroyer, Gerhard. "Stevioside and Stevia-sweetner in food: application, stability and interaction with food ingredients." Journal Fur Verbraucherschutz Und Lebensmittelsicherheit, vol. 5, No. 2, Feb. 2010, pp. 225-229.
Liu, Tuomin, et al., "Shrinkage of Low-Density Polyethylene Film." Polymer Engineering and Science, Apr. 1988, vol. 28, No. 8, pp. 517-521.
LWT-Food Science and Technology, "The Low Calorie Sweetener Stevioside: Stability and Interaction with Food Ingredients." 32(8), 509-512 (1999) (4 pgs.).
Material Safety Data Sheet for PuR Flavor Options—Grape Flavor Concentrate bearing issue date of Dec. 10, 2007 (5 pages).
Material Safety Data Sheet for PuR Flavor Options—Lemon Flavor Concentrate bearing issue date of Dec. 10, 2007 (5 pages).
Material Safety Data Sheet for PuR Flavor Options—Peach Flavor Concentrate bearing issue date of May 12, 2007 (5 pages).
Material Safety Data Sheet for PuR Flavor Options—Raspberry Flavor Concentrate bearing issue date of May 12, 2007 (5 pages).
Material Safety Data Sheet for PuR Flavor Options—Strawberry Flavor Concentrate bearing issue date of May 12, 2007 (5 pages).
National Academy of Sciences, Food Chemicals Codex Fourth Edition (1996), part I (99 pgs.).
National Academy of Sciences, Food Chemicals Codex Fourth Edition (1996), part II (100 pgs.).
National Academy of Sciences, Food Chemicals Codex Fourth Edition (1996), part III (100 pgs.).
National Academy of Sciences, Food Chemicals Codex Fourth Edition (1996), part IV (99 pgs.).
National Academy of Sciences, Food Chemicals Codex Fourth Edition (1996), part IX (99 pgs.).
National Academy of Sciences, Food Chemicals Codex Fourth Edition (1996), part V (99 pgs.).
National Academy of Sciences, Food Chemicals Codex Fourth Edition (1996), part VI (99 pgs.).
National Academy of Sciences, Food Chemicals Codex Fourth Edition (1996), part VII (99 pgs.).
National Academy of Sciences, Food Chemicals Codex Fourth Edition (1996), part VIII (99 pgs.).
National Academy of Sciences, Food Chemicals Codex Fourth Edition (1996), part X (22 pgs.).
Owen R. Fennema, Fennema\s Food Chemistry (4th ed. 2008), part I (99 pgs.).
Owen R. Fennema, Fennema\s Food Chemistry (4th ed. 2008), part II (99 pgs.).
Owen R. Fennema, Fennema\s Food Chemistry (4th ed. 2008), part III (99 pgs.).
Owen R. Fennema, Fennema\s Food Chemistry (4th ed. 2008), part IV (99 pgs.).
Owen R. Fennema, Fennema\s Food Chemistry (4th ed. 2008), part IX (99 pgs.).
Owen R. Fennema, Fennema\s Food Chemistry (4th ed. 2008), part V (99 pgs.).
Owen R. Fennema, Fennema\s Food Chemistry (4th ed. 2008), part VI (99 pgs.).
Owen R. Fennema, Fennema\s Food Chemistry (4th ed. 2008), part VII (99 pgs.).
Owen R. Fennema, Fennema\s Food Chemistry (4th ed. 2008), part VIII (99 pgs.).
Owen R. Fennema, Fennema\s Food Chemistry (4th ed. 2008), part X (99 pgs.).
Owen R. Fennema, Fennema\s Food Chemistry (4th ed. 2008), part XI (99 pgs.).
Owen R. Fennema, Fennema\s Food Chemistry (4th ed. 2008), part XII (47 pgs.).
Oxford English Dictionary definition: "select" and "selected" available at <http://www.oed.com>, Nov. 15, 2015, 4 pages.
Phillip R. Ashurst, Chemistry and Technology of Soft Drinks and Fruit Juices (2d ed. 2005), part I (99 pgs.).
Phillip R. Ashurst, Chemistry and Technology of Soft Drinks and Fruit Juices (2d ed. 2005), part II (99 pgs.).
Phillip R. Ashurst, Chemistry and Technology of Soft Drinks and Fruit Juices (2d ed. 2005), part III (99 pgs.).
Phillip R. Ashurst, Chemistry and Technology of Soft Drinks and Fruit Juices (2d ed. 2005), part IV (96 pgs.).
PuR Raspberry (3 pages).
Random House Webster's College Dictionary, 1995, p. 1215.
Seamed Film Grades, Ultrapak Shrink Sleeve Specialists, date unknown, 2 pages.
Soroka, Walter. "Fundamentals of Packaging Technology." 1995, p. 231.
Soroka, Walter. "Illustrated Glossary of Packaging Terminology." Institute of Packaging Professionals, Second Edition, 2008, p. 199.
Springer, Erich, K. "pH Measurement Guide." Hamilton, 2014, pp. 3-67.

(56) References Cited

OTHER PUBLICATIONS

Westcott, C. Clark, "pH Measurements." Chapter 1: Principles of pH Measurements, Academic Press, New York, London, 1978, pp. 1-10.
Extended European Search Report, European Patent Application No. 17158731.4, dated Mar. 24, 2017, 8 pages.
"Acidulants: Ingredients That do More Than Meet the Acid Test." Food Technology, Jan. 1990, pp. 76-83.
"Consumer Product Companies Rely on Shrink Sleeves to Manage Brand Identity, Sustainability and Cost-Savings Initiatives." Gilbreth Packaging, 2009, 4 pages.
"Foil Water 'Bottle' Quenches a Thirst for Flavor." Packaging Digest, Aug. 2005, <www.packagingdigest.com>, 1 page.
"Health and Hydration Drive Product Innovation." PR Newswire, May 27, 2005, Business Insights: Essentials. <www.prnewswire.com> retrieved Feb. 11, 2016, 2 pages.
"Juice it Up." Convenience Store News, Sep. 19, 2005, <www.csnews.com>, 1 page.
"Self-Teaching Guide for Food Acidulants." Bartek, date unknown, 37 pages.
"What's Next." Progressive Grocer., vol. 84, issue 10, dated Jul. 1, 2005, 3 pages.
"What's Hot—A Splash of Flavor for Water." Drug Store News, <www.drugstorenews.com>, Sep. 11, 2006, 2 pages.
Angrisani, Carol. "Still Water Runs Deep." SN: Supermarket News, vol. 53, issue 22, May 30, 2005, 4 pages.
Berry-Go-Round Smoothie Shampoo, Record ID 557730, Brand: L'Oreal Kids Carnival Series, date published Jul. 2006, Mintel website, http://www.gnpd.com, 3 pages.
Breidt Jr., Fred, et al., "Determination of 5-Log Reduction Times for Food Pathogens in Acidified Cucumbers During Storage at 10 and 25 degrees C." Journal of Food Protection, vol. 70, No. 11, 2007, pp. 2638-2641.
Declaration of Dr. Karl Ragnarsson, Ph.D., Under 37 C.F.R. § 1.132 dated Jun. 15, 2012 (filed in U.S. Appl. No. 13/341,339).
Declaration of Dr. Leslie G. West, Ph.D., Under 37 C.F.R. § 1.132 dated Jun. 15, 2012 (filed in U.S. Appl. No. 13/341,339) (3 pgs.).
Dove Shampoo Bottle Photographs, date unknown, 4 pages.
Ellinger, R. H., "Functions and Applications of Phosphates in Food System." Phosphates as Food Ingredients. CRC Press, Aug. 9, 1972, pp. 31-35 and 167-185.
Extra Gentle Shampoo, Record ID 10203155, Brand: L'Oreal Kids, date published Jan. 2005, Mintel website, http://www.gnpd.com, 2 pages.
Gangemi, Jeffrey. "Kids' Health Food Builds Strong Business Bodies." BusinessWeek Online, Sep. 20, 2006, 4 pages.
Grice, H. C., et al., "Sucralose-An Overview of the Toxicity Data." Food and Chemical Toxicology, vol. 38, Suppl. 2, 2000, S1-S6.
Igoe, Robert S., et al., Dictionary of Food Ingredients. Fourth Edition, Aspen Publishers, Inc., 2001, pp. 161, 163-167 and 223-234, 20 pages.
Lawlor, Kathleen A., et al., "Microbiological Spoilage of Beverages." Compendium of the Microbiological Spoilage of Foods and Beverages. Food Microbiology and Food Safety. Ed. William H. Sperber and Michael P. Doyle, Springer Science + Business Media, LLC, 2009, pp. 245-284.
Lyn O'Brien Nabors, ed. Alternative Sweeteners. Third Edition, Revised and Expanded, 2001, 574 pages.
Orange Mango Smoothie Shampoo, Record ID 10134116, Brand: L'Oreal Kids, date published Apr. 2003, Mintel website, http://www.gnpd.com, 2 pages.
Phillips, G. Frank, et al., "Beverage Acids, Flavors, Colors, and Emulsifiers." Beverages: Carbonated and Noncarbonated, Revised Edition, AVI Publishing Company, Inc. 1981, pp. 152-161 and 164-207.
Rahman, Mohammad Shafiur, et al., "Water Activity and Food Preservation." Handbook of Food Preservation. Second Edition, Ed. M. Shafiur Rahman, CRC Press, 2007, pp. 447-476.
Ramesh, M. N., "Pasteurization and Food Preservation." Handbook of Food Preservation. Second Edition, Ed. M. Shafiur Rahman, CRC Press, 2007, pp. 571-583.
Schmidt, Shelly J., et al., Water Activity in Foods: Fundamentals and Applications, "Water Activity Values of Select Food Ingredients and Products." Blackwell Publishing and the Institute of Food Technologies, 2007, pp. 407-410.
Segner, W. P., et al., "Effect of Sodium Chloride and pH on the Outgrowth of Spores of Type E Clostridium Botulinum at Optimal and Suboptimal Temperatures." Applied Microbiology, Jan. 1966, vol. 14, No. 1, pp. 49-54.
Shampoo, Record ID 844412, Brand: Batman Kids, date published Jan. 2008, Mintel website, http://www.gnpd.com, 2 pages.
Silk Touch Exfoliating Shower Cream, Record ID 514379, Brand: Duru Looks, date published Mar. 2006, Mintel website, http://www.gnpd.com, 3 pages.
Sortwell, Daniel R. "Balancing the Sweet & Sour: Acidulant Selection for Beverages." Food & Beverages of Asia, Apr. 2004, pp. 59-61.
Sortwell, Daniel, et al., "Improving the Flavor of Fruit Products with Acidulants." NutriQuim, S.A. de C.V. and Bartek Ingredients, Inc., Mar. 28, 1996, 10 pages.
Sperber, William H. "Microbiological Spoilage of Acidified Specialty Products." Compendium of the Microbiological Spoilage of Foods and Beverages. Food Microbiology and Food Safety, Ed. William H. Sperber and Michael P. Doyle, Springer Science + Business Media, LLC, 2009, pp. 285-299.
Squires, Sally. "Lean Plate Club; Nutrition and Health." The Washington Post Online, www.washingtonpost.com, dated Jan. 24, 2006, 17 pages.
Taylor, Barry. Chemistry and Technology of Soft Drinks and Fruit Juices, Second Edition, "Other Beverage Ingredients." Blackwell Publishing, 2005, pp. 90-128.
The Complete Technology Book on Alcoholic and Non-Alcoholic Beverages (Fruit Juices, Whisky, Beer, Rum and Wine). "Acids, Colours, Preservatives and Other Additives." NPCS Board of Consultants & Engineers, Asia Pacific Business Press Inc., Oct. 1, 2008, pp. 118-139.
Ultrapak Shrink Sleeve Specialists, Material Safety Data Sheet—Seamed PVC Film with Printed Samples, updated Mar. 2007, samples produced prior to 2012, 15 pages.
Ultrapak Shrink Sleeve Specialists, Product Brochure, printed Sep. 2008, with Samples produced prior to 2012, 7 pages.

* cited by examiner

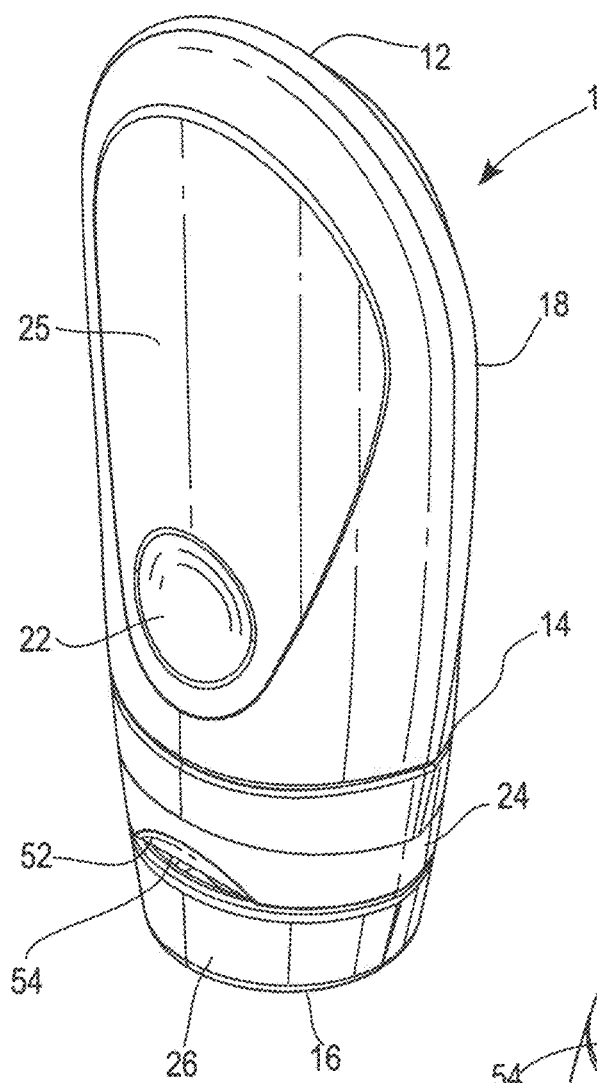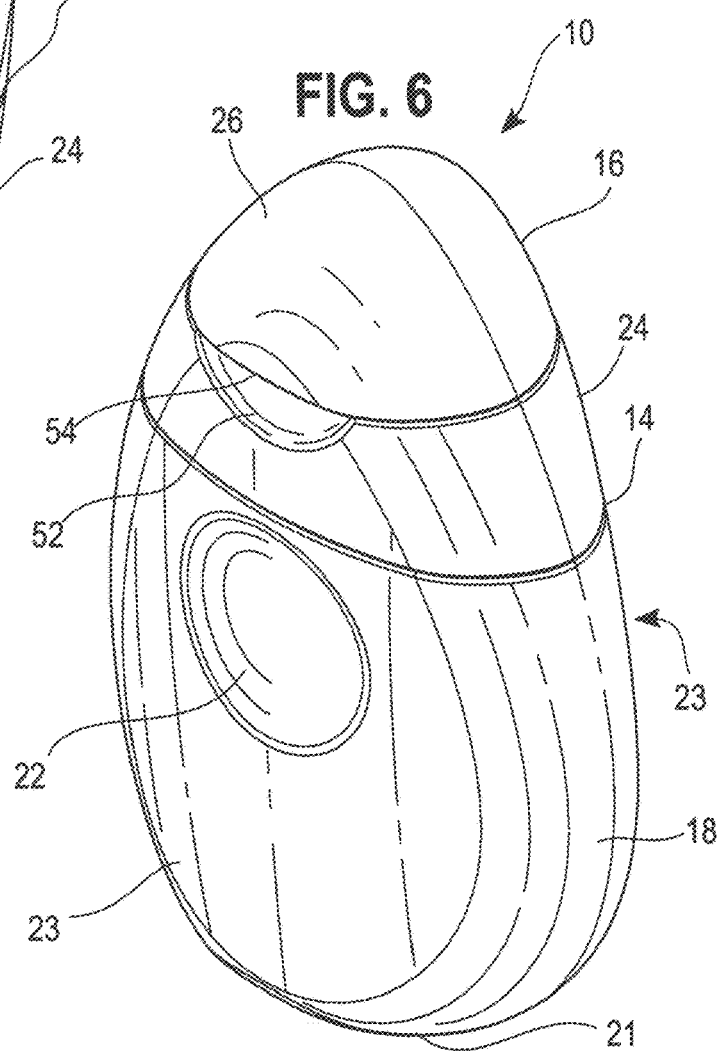

FIG. 7
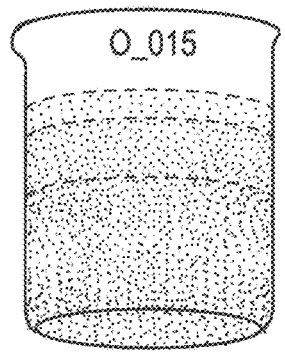
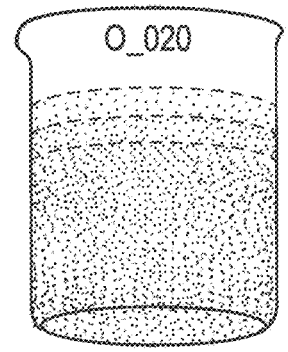
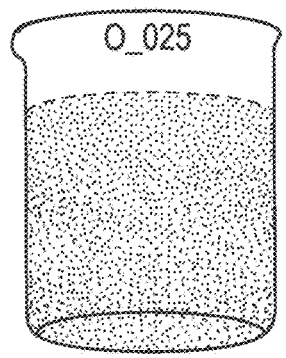
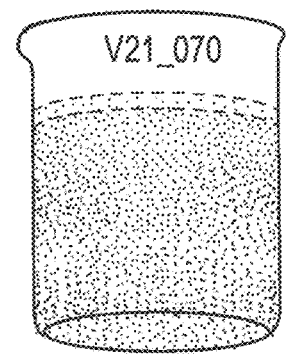
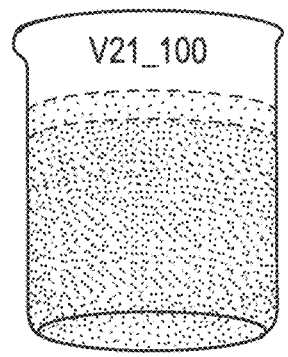
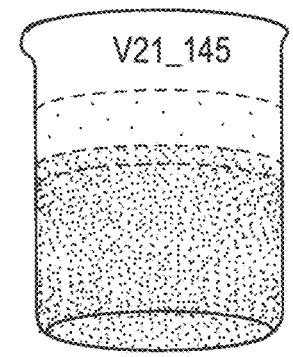
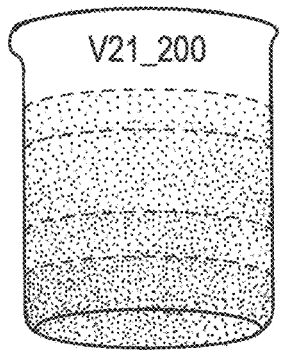

SHELF STABLE, CONCENTRATED, LIQUID FLAVORINGS AND METHODS OF PREPARING BEVERAGES WITH THE CONCENTRATED LIQUID FLAVORINGS

CROSS REFERENCE TO RELATED APPLICATION

This application claims the benefit of U.S. Provisional Application No. 61/651,958, filed May 25, 2012, which is incorporated herein by reference in its entirety.

FIELD

The disclosure relates to shelf stable, concentrated, liquid flavorings, and particularly to shelf stable, concentrated, liquid flavorings that are suitable for dilution with a beverage to provide a flavored beverage. The disclosure also relates to methods of preparing flavored beverages with the shelf-stable concentrated liquid flavorings.

BACKGROUND

Flavored coffee and beverages are widely accepted by consumers. Flavored coffee beverages can be prepared by the use of flavored roast and ground coffee products or flavored instant coffee products. For example, dried coffee products are widely available having vanilla, hazelnut, and other flavor additives. These types of products are flavored by the coffee manufacturer and are purchased by the consumers in an already flavored form. These types of products do not allow for customization by the consumer as to the desired amount or type of flavor in the product.

Coffee shops often sell flavored coffee beverages that are prepared by combining liquid flavor syrups with an unflavored coffee or espresso product. For example, a hazelnut flavored latte can be provided by addition of a liquid hazelnut flavor syrup to a latte beverage. Generally, the currently available liquid flavoring syrups are shelf stable due to a relatively acidic pH. Some commercial liquid flavorings have a pH of about 4.6 or lower. The acidic pH is beneficial from a microbial stability standpoint but is generally problematic due to the risk of causing curdling when added to a beverage containing a dairy liquid, such as cream or milk. Because of the low pH, baristas at coffee shops typically add the flavor syrup to the coffee prior to addition of milk or other dairy liquids. By doing so, the flavor syrup is dispersed in the coffee, and the local effect on pH reduction by introduction of the acidic syrup is minimized. The milk or other dairy liquid can then be added to the flavored coffee with reduced risk of curdling.

BRIEF DESCRIPTION OF THE FIGURES

FIG. 5 is a perspective view of an alternative container showing a lid in a closed position;

FIG. 6 is a perspective view of an alternative container showing a lid in a closed position;

FIG. 7 is a bottom perspective of a representation of the results of the mixing ability test for tested nozzles showing beakers with varying levels of mixture;

DETAILED DESCRIPTION

Figure 1:
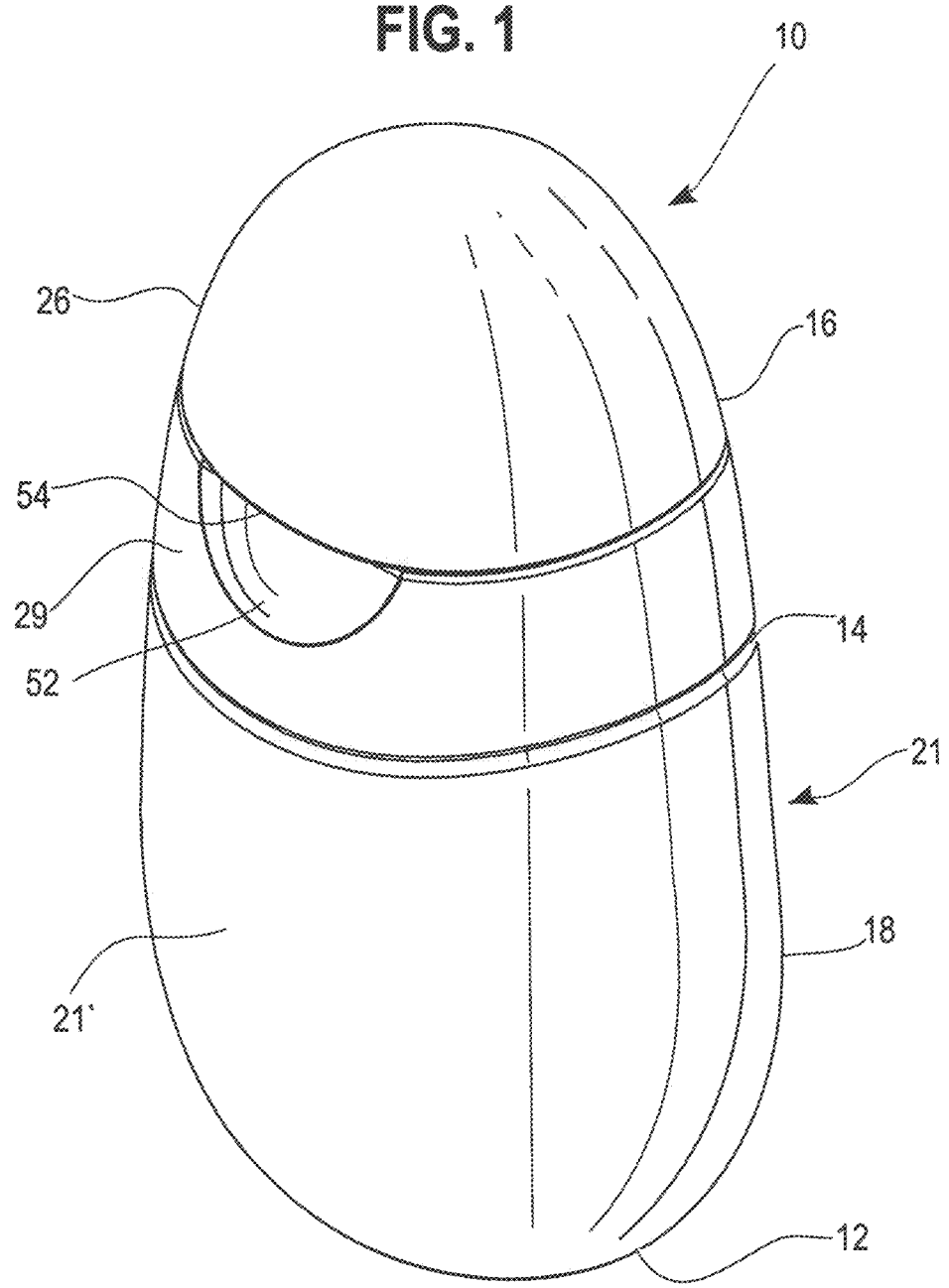
FIG. 1 is a perspective view of a container showing a lid in a closed position.
Figure 2:
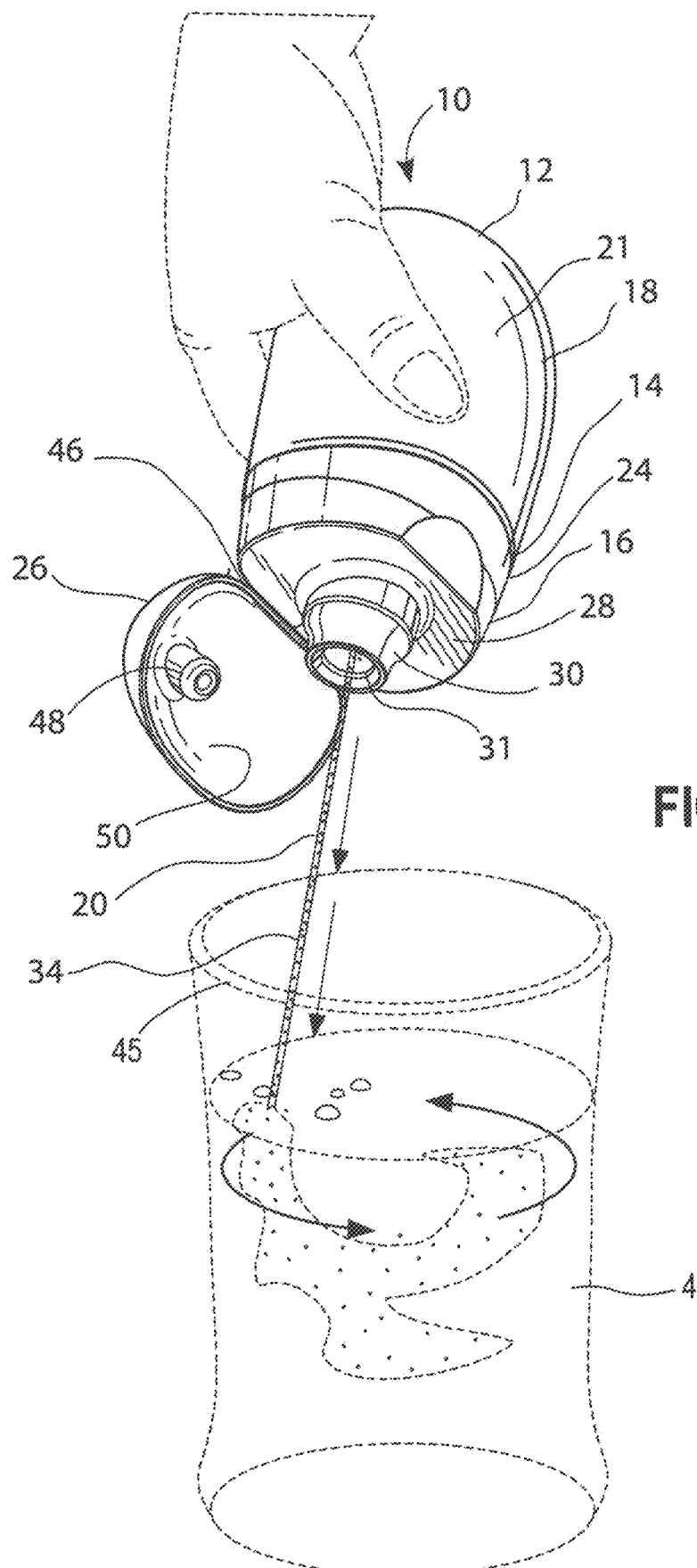
FIG. 2 is a schematic perspective view of the container of FIG. 1 being squeezed to dispense a jet of liquid therefrom into a container housing a second liquid.

Concentrated liquid flavorings and methods of preparing flavored beverages using the concentrated liquid flavorings are described herein. The concentrated liquid flavorings are shelf stable for prolonged storage times, such as at least about three months, at ambient temperatures (e.g., about 20° to about 25° C.). Shelf stability is provided, at least in part, by acidic pH and/or reduced water activity. By one approach, the concentrated liquid flavorings are intended to provide flavor to a beverage, such as coffee, tea, milk, or other savory beverage. In one aspect, the concentrated liquid flavorings are provided in a convenient portable and dosable format that can be easily used by a consumer to provide the desired type of flavor and flavor intensity to a beverage. For instance, a consumer could obtain a ready-to-drink coffee beverage from a coffee shop and then dose the liquid flavoring into the beverage to provide a flavored coffee beverage to their liking. The concentrated liquid flavorings provided herein offer a convenient and inexpensive way to prepare personalized beverages. While the disclosure is primarily directed to the use of the concentrated liquid flavorings for providing flavored beverages, use of the liquid flavorings to provide desired flavor to a variety of food products is also contemplated.

Advantageously, the quantity of concentrated liquid flavoring needed to provide a desired amount of flavor to a beverage is small due to the high concentration factor of the product. Therefore, the concentrated liquid flavorings have a low caloric content per serving, and addition of the small quantity of flavoring has a minimal impact on the temperature of the beverage. For example, commercially available flavor syrups which typically have a serving size of 30 mL per 8 oz. beverage can lower the temperature of a beverage by about 10° F., whereas the smaller serving size of the concentrated liquid flavorings described herein (e.g., about 1 to about 3 mL, in another aspect about 1.5 to about 2.5 mL, in another aspect about 2 mL per 8 oz. beverage) generally results in a temperature change of less than about 2° F.

It has been found that concentrated liquid flavorings having a pH of less than about pH 5 can cause curdling in milk-containing beverages. As will be described in more detail herein, certain techniques of dispersing the flavoring in the milk-containing beverages can be used to avoid or reduce the risk of curdling. However, it is generally desirable that the concentrated liquid flavorings described herein have a pH greater than about 3 because flavorings having a lower pH are at increased risk of causing curdling regardless of the technique used to disperse the flavoring in the beverage.

By one approach, a concentrated liquid flavoring having a reduced pH is provided. In one aspect, the reduced pH flavoring has a pH between about 3.8 to about 4.5, in another aspect about 4.0 to about 4.5, and in another aspect about 4.0 to about 4.2. The concentrated liquid flavoring having reduced pH comprises about 40 percent to about 90 percent water, about 2 percent to about 40 percent flavoring, about 0 to about 30 percent non-aqueous liquid, and an amount of acidulant effective to provide a pH between about 3.8 to about 4.5. In one aspect, the concentrated liquid flavoring includes less than about 2.0 percent acidulant, in another aspect about 0.005 to about 1.5 percent acidulant, in another aspect about 0.02 to about 1.0 percent acidulant, and in yet another aspect about 0.06 to about 0.09 percent acidulant by weight of the concentrated liquid flavoring. When a buffer is included in the concentrated liquid flavoring, higher levels of acid may be included while still providing the pH in the stated range. The reduced pH flavoring may further comprise sweetener, such as a nutritive or non-nutritive sweetener, in an amount such that minimal or no sweetness is provided to the beverage upon dilution.

By another approach, a concentrated liquid flavoring having reduced water activity is provided. The concentrated liquid flavoring has a water activity of less than about 0.84, in another aspect less than about 0.80, and in another aspect less than about 0.76. The concentrated liquid flavoring having reduced water activity comprises about 5 percent to about 45 percent water, about 3 percent to about 40 percent flavoring, and at least about 40 percent sweetener. In one aspect, the sweetener can generally be added in an amount of at least about 40 percent, in another aspect about 40 to about 80 percent, in another aspect about 40 to about 70 percent, and in yet another aspect about 40 to about 60 percent. Other amounts of sweetener can also be included, if desired. The concentrated liquid flavoring may further include a non-aqueous liquid other than sweetener. The sweetener and non-aqueous liquid generally are included in amounts effective to provide a concentrated liquid flavoring having the desired water activity. The combined amount of sweetener and non-aqueous liquid in the concentrated liquid flavoring is not particularly limited so long as the remaining ingredients remain dissolved or homogeneously suspended in the flavoring throughout the product's shelf life. At least in some applications, it may be desirable to keep the non-aqueous liquid under about 30 percent by weight of the flavoring to avoid adverse impact on the taste of the finished beverage, particularly for coffee beverages. In some approaches, the flavorings having reduced water activity have a pH between about 5.0 to about 7.0, in another aspect about 5.0 to about 6.5, in another aspect about 5.0 to about 5.5, in another aspect about 5.0 to about 5.2, so that the flavorings can be added to protein-containing beverages with minimal or no risk of causing curdling.

As used herein, the phrase "liquid" refers to a non-gaseous, flowable, fluid composition at room temperature (i.e., about 20° to about 25° C.). By "shelf stable" it is meant that the concentrated liquid flavoring is microbially stable such that the concentrated flavoring has an aerobic plate count (APC) of less than about 5000 CFU/g, yeast and mold at a level less than about 500 CFU/g, and coliforms at 0 MPN/g for at least about three months, in another aspect at least about six months, in another aspect at least about eight months, in another aspect at least about ten months, and in yet another aspect at least about twelve months, when stored at room temperature in a sealed container. By some approaches, the concentrated liquid flavoring is bactericidal and prevents germination of spores. As bacteria, yeast, and mold require a certain amount of available water for growth, controlling water activity—not just moisture content—is an effective way to control microbial growth. A water activity of less than about 0.84 is beneficial to control bacterial growth and a water activity of less than about 0.76 is beneficial to control yeast and mold growth.

The water activity of the flavoring can be measured with any suitable device, such as, for example, an AquaLab Water Activity Meter from Decagon Devices, Inc. (Pullman, Wash.). An AquaLab Water Activity Meter with Volatile Blocker should be used when the flavoring includes more than about 10 percent propylene glycol and/or ethanol. Other water-activity reducing liquids can also be included in the concentrates, if desired, so long as the liquid provides the desired taste profile in the final beverage.

As used herein, the term "concentrate" or "concentrated" means a liquid composition that can be diluted with an aqueous, potable liquid, typically a beverage, to provide a flavored beverage. In various approaches, the concentrated liquid flavoring is formulated to be diluted in a beverage by a factor of about 40 to about 160 times to provide a flavored beverage, which can be, for example, an 8 ounce beverage. By other approaches, the concentrated liquid flavoring can be diluted by a factor of about 80 to about 140 times, in another aspect about 110 to about 130 times, in another aspect about 115 to about 125 times, to provide a desired level of flavor intensity to a final beverage, which can be, for example, an 8 ounce beverage. The term "final flavored beverage" or "final beverage" as used herein means a beverage that has been prepared by diluting the concentrated liquid flavoring in a beverage to provide a flavored beverage in a potable, consumable form. In some aspects, the concentrated liquid flavoring is non-potable due to flavor intensity. By way of example, the concentrated liquid flavoring may have a concentration of about 40× to about 160× (which is equivalent to about 1 part flavoring per about 39 parts beverage to about 159 parts beverage to provide the flavored beverage). In one aspect, the flavor profile of the beverage is taken into account when determining an appropriate level of dilution, and thus concentration, of the flavoring. The dilution factor of the concentrated liquid flavoring can also be expressed as the amount necessary to provide a single serving of concentrated liquid flavoring.

Particularly with respect to the reduced water activity flavorings, the sweetener may be any sugar or sugar alcohol effective to reduce the water activity of the concentrated liquid flavoring. The sweetener can be granular or in liquid form. Suitable sweeteners include fructose, glucose, sucrose, galactose, xylitol, mannitol, sorbitol, polyol, erythritol, maltitol, honey, corn syrup, high fructose corn syrup, the like, and combinations thereof. The selection of sweetener and amount of sweetener included in the concentrated liquid flavoring may depend, at least in part, on the desired viscosity of the flavoring. In one aspect, the sweetener comprises a major portion of fructose, which has a favorable taste, high capacity for lowering water activity, and is a relatively inexpensive ingredient. Of course, other sweeteners may also be used, if desired. It was found that flavored beverages, particularly coffee beverages, prepared from flavoring formulations containing a major portion of fructose do not have a solvent taste that was found to occur when major amounts of non-aqueous liquids, such as propylene glycol or glycerin, were used.

By one approach, despite the possible inclusion of sweeteners (both nutritive and non-nutritive) in the concentrated liquid flavorings described herein, the flavorings do not substantially contribute sweetness to the beverage in which they are dispensed due to the high dilution factor of the products. Even though the reduced water activity flavorings generally are more heavily sweetened than the low pH flavorings described herein, the reduced water activity flavorings described herein have a sweetness level of about 50 to about 70 degrees Brix (in another aspect about 50 to about 65 degrees Brix, and in another aspect about 55 to about 60 degrees Brix), but, upon dilution in a beverage, do not substantially contribute sweetness to the beverage. In one aspect, the concentrated liquid flavoring having a concentration of about 40× to about 160× can be diluted in a beverage to deliver a sweetness level equivalent to about 2 degrees Brix, in another aspect less than about 1.5 degrees Brix, and in another aspect less than about 1 degree Brix. One degree Brix corresponds to 1 gram of sucrose in 100 grams of aqueous solution.

For purposes of calculating the water content of the liquid flavorings described herein, the amount of water in the flavoring includes water included as a separate ingredient as well as any water provided in any ingredients used in the concentrate. Generally, the concentrated liquid flavorings include about 5 to about 90 percent water. Reduced pH formulations generally include larger amounts of water than the reduced water activity formulations. For example, concentrated liquid flavorings having a reduced pH generally include about 40 to about 90 percent water, in another aspect about 60 to about 90 percent water, in another aspect about 65 to about 85 percent water, and in yet another aspect about 70 to about 85 percent water, whereas the concentrated liquid flavorings having a reduced water activity generally include about 5 to about 45 percent water, in another aspect about 15 to about 45 percent water, and in yet another aspect about 20 to about 35 percent water.

In some aspects, the concentrated flavoring may further include non-nutritive sweetener. Generally, the non-nutritive sweetener is provided in a non-sweetening amount when diluted to provide the flavored beverage. It has been found that inclusion of non-nutritive sweeteners in non-sweetening amounts can improve the overall flavor perception of the beverages without providing a sweet flavor that is found undesirable by many consumers, particularly when the flavorings are added to coffee. Useful non-nutritive sweeteners include, for example, sucralose, aspartame, stevia, monatin, luo han guo, neotame, sucrose, Rebaudioside A (often referred to as "Reb A"), cyclamates (such as sodium cyclamate), acesulfame potassium, and combinations thereof.

The reduced pH and reduced water activity concentrated liquid flavorings described herein may further comprise a non-aqueous liquid ("NAL"). As used herein, the term "NAL" excludes the sweetener. At least in some approaches it has been found that keeping the amount of non-aqueous liquid below about 30 percent can be beneficial to avoid contributing off flavor notes to the beverage. In one aspect, the concentrated liquid flavorings include a total non-aqueous liquid content of about 5 percent to about 30 percent, in another aspect about 5 percent to about 25 percent, and in another aspect about 10 percent to about 20 percent by weight of the concentrated liquid flavoring. By "total non-aqueous liquid content" is meant the amount of any non-aqueous liquid from all sources except for the sweetener and specifically includes non-aqueous liquids contributed by the flavor component except for the flavor key of the flavor component. Exemplary NALs include, but are not limited to, propylene glycol, glycerol, triacetin, ethanol, ethyl acetate, benzyl alcohol, vegetable oil, vitamin oil (e.g., Vitamin E, Vitamin A), isopropanol, 1,3-propanediol, and combinations thereof. In one aspect, selection of NAL for use in the beverage concentrates may depend, at least in part, on the ability of the NAL to solubilize other ingredients, such as hydrophobic ingredients, of the flavoring or on the flavor provided by the NAL and the desired taste profile in the final beverage. In yet other instances, selection of NAL may also depend, at least in part, on the viscosity and/or the desired density of the resulting concentrated liquid flavoring.

When included in the concentrated liquid flavorings, particularly the reduced pH flavorings described herein, the acidulant can include, for example, any food grade organic or inorganic acid, such as but not limited to sodium acid sulfate, citric acid, malic acid, succinic acid, acetic acid, hydrochloric acid, adipic acid, tartaric acid, fumaric acid, phosphoric acid, lactic acid, salts thereof, and combinations thereof. The selection of the acidulant may depend, at least in part, on the desired pH of the concentrated liquid flavoring. In another aspect, the amount of acidulant included in the concentrated liquid flavoring may depend on the strength of the acid. For example, a larger quantity of lactic acid would be needed to reduce the pH of the concentrated liquid flavoring than a stronger acid, such as phosphoric acid. By another approach, the concentration factor of the concentrated liquid flavoring can be expressed as the level of dilution needed to obtain a final beverage having a total acidity of less than about 0.002 percent, in another aspect less than about 0.0015 percent, in another aspect less than about 0.001 percent as contributed by the liquid flavoring. In some approaches, the acidulant is sodium acid sulfate, which has the ability to lower pH without increasing sour taste to the product. Also, from a taste perspective, sodium acid sulfate can be beneficially used in combination with "brown" flavors such as vanilla, coffee, and chocolate, although other acidulants can be used if desired.

The concentrated liquid flavorings described herein may be provided with a variety of different flavors, such as, for example, hazelnut, praline, vanilla, French vanilla, almond, caramel, pumpkin, crème brulee, mocha, mint, peppermint, gingerbread, toffee, Irish cream, cinnamon, maple, coconut, amaretto, chocolate, butterscotch, egg nog, tiramisu, praline, fruit (e.g., peach, raspberry, blueberry, lemon, strawberry, cherry, orange, lime), coffee, and tea, and combinations thereof. The flavor is provided by a flavor component including a flavor key. The term "flavor key," as used herein, is the component that imparts the predominant flavor to the flavor component and includes flavor agents such as essential oils, flavor essences, flavor compounds, flavor modifier, flavor enhancer, and the like. The flavor key is exclusive of other ingredients of the flavor component, including carriers and emulsifiers, which do not impart the predominant flavor to the flavor component.

The concentrated liquid flavorings described herein, including both the reduced pH and reduced water activity flavorings, generally include about 2 to about 40 percent flavor component, in another aspect about 5 to about 35 percent flavor component, in another aspect about 10 to about 25 percent flavor component, and in another aspect about 12 to about 20 percent flavor component. In some approaches, the concentrated liquid flavorings generally include about 0.1 to about 20.0 percent flavor key, in another aspect about 1 to about 15.0 percent flavor key, and in another aspect about 5 to about 15.0 percent flavor key. The amount of flavor key included depends on the relative strength of the flavor key. For example, certain flavors like hazelnut and caramel are stronger than other flavors such as vanilla or chocolate. Accordingly, lesser amounts of the stronger flavors can be included, such as in an amount of about 0.1 to about 4 percent, whereas as greater amounts of the weaker flavors may need to be included, such as about 3 to about 10 percent by weight of the concentrated liquid flavoring.

Because the concentrated liquid flavorings are formulated to be highly concentrated, the liquid flavorings comprise a much higher level of flavor component and flavor key than conventional concentrated liquid flavorings. In one approach, the low water activity concentrated liquid flavorings include a ratio of flavor component to carbohydrate nutritive sweetener of about 1:60 to about 1:1, in another aspect about 1:40 to about 1:1, in another aspect about 1:20 to about 1:1, in another aspect about 1:10 to about 1:1, and in another aspect about 1:5 to about 1:1. By another approach, the low water activity concentrated liquid flavorings have a ratio of flavor key to sweetener of about 1:800 to about 1:2, in another aspect about 1:200 to about 1:2, in another aspect about 1:100 to about 1:2, in another aspect about 1:50 to about 1:2, and in another aspect about 1:10 to about 1:2.

By one approach, the low pH concentrated liquid flavorings include a ratio of flavor component to water of about 1:90 to about 1:1, in another aspect about 1:45 to about 1:1 in another aspect about 1:20 to about 1:1, in another aspect about 1:10 to about 1:1, and in another aspect about 1:5 to about 1:1. By another approach, the low pH concentrated liquid flavorings have a ratio of flavor key to sweetener of about 1:1600 to about 1:2, in another aspect about 1:800 to about 1:2, in another aspect about 1:200 to about 1:2, in another aspect about 1:100 to about 1:2, in another aspect about 1:50 to about 1:2, and in another aspect about 1:10 to about 1:2. In yet another approach, the low pH concentrated liquid includes a ratio of flavor component to acid of about 1:10 to about 1:0.0002, in another aspect about 1:5 to about 1:0.0002, in another aspect about 1:1 to about 1:0.0002, and in another aspect about 1:0.1 to about 1:0.0002.

Flavor components useful in the concentrated liquid flavorings described herein may include, for example, liquid flavor components (including, for example, alcohol-containing flavor components (e.g., those containing ethanol, propylene glycol, 1,3-propanediol, glycerol, and combinations thereof), and flavor emulsions (e.g., nano- and micro-emulsions)) and powdered flavor components (including, for example, extruded, spray-dried, agglomerated, freeze-dried, and encapsulated flavor components). The flavor components may also be in the form of an extract, such as a fruit extract. The flavor components can be used alone or in various combinations to provide the concentrated liquid flavorings with a desired flavor profile.

A variety of commercially-available flavor components can be used, such as those sold by Givaudan (Cincinnati, Ohio) and International Flavors & Fragrances Inc. (Dayton, N.J.). In some aspects, the precise amount of flavor component included in the composition may vary, at least in part, based on the concentration factor of the flavoring, the concentration of flavor key in the flavor component, and desired flavor profile of a flavored beverage prepared with the concentrated liquid flavoring. Generally, extruded and spray-dried flavor components can be included in the flavorings in lesser amounts than alcohol-containing flavor components and flavor emulsions because the extruded and spray-dried flavor components often include a larger percentage of flavor key. Exemplary recipes for flavor components are provided in Table 1 below. Of course, flavor components with other formulations may also be used, if desired.

TABLE 1

Exemplary Flavor Component Formulations

|  | Propylene Glycol Flavorings | Ethanol-Containing Flavorings | Flavor Emulsions | Extruded Flavorings | Spray-Dried Flavorings |
| --- | --- | --- | --- | --- | --- |
| Flavor key | 1-20% | 1-20% | 1-10% | 1-40% | 1-40% |
| Water | 0-10% | 0-10% | 70-80% | — | — |
| Ethanol | — | 80-95% | — | — | — |
| Propylene glycol | 80-95% | — | — | 0-4% | 0-4% |
| Emulsifier | — | — | 1-4% | 0.1-10% | — |
| Carrier | — | — | — | 1-95% | 1-95% |
| Emulsion stabilizer | — | — | 15-20% | — | — |
| Preservative | 0-2% | 0-2% | 0-2% | 0-2% | 0-2% |

Many flavor components include one or more non-aqueous liquids, typically in the form of alcohols having one or more hydroxyl groups, including ethanol and propylene glycol, although others may be used, if desired. The flavor components may also include 1,3-propanediol, if desired.

When such flavor components are included in the concentrated liquid flavorings described herein, the non-aqueous liquid content of the flavor components is included in the calculation of the total NAL content of the concentrated flavoring. For example, if a flavor component has eighty percent propylene glycol and the flavor component is included in the concentrated liquid flavoring at an amount of 30 percent, the flavor component contributes 24 percent propylene glycol to the total non-aqueous liquid content of the concentrated liquid flavoring.

Extruded and spray-dried flavor components often include a large percentage of flavor key and carrier, such as corn syrup solids, maltodextrin, gum arabic, starch, and sugar solids. Extruded flavor components can also include small amounts of alcohol and emulsifier, if desired. Flavor emulsions can also include carriers, such as, for example, starch. In one aspect, the flavor emulsion does not include alcohol. In other aspects, the flavor emulsion may include low levels of alcohol (e.g., propylene glycol, 1,3-propanediol, and ethanol). A variety of emulsifiers can be used, such as but not limited to sucrose acetate isobutyrate and lecithin, and an emulsion stabilizer may be included, such as but not limited to gum acacia. Micro-emulsions often include a higher concentration of flavor key and generally can be included in lesser quantities than other flavor emulsions.

In yet another aspect, a variety of powdered flavor components may be included in the concentrated liquid flavoring. The form of the powdered flavor components is not particularly limited and can include, for example, spray-dried, agglomerated, extruded, freeze-dried, and encapsulated flavor components. Suitable powdered flavor components include, for example, Natural & Artificial Tropical Punch from Givaudan (Cincinnati, Ohio), Natural & Artificial Orange from Symrise (Teterboro, N.J.), and Natural Lemon from Firmenich Inc. (Plainsboro, N.J.). Other powdered flavor components may also be used, if desired.

Optionally, colors can be included in the concentrated liquid flavorings. The colors can include artificial colors, natural colors, or a combination thereof and can be included in the range of 0 to about 0.2 percent, in another aspect about 0.01 to 0.1 percent. In formulations using natural colors, a higher percent by weight of the color may be needed to achieve desired color characteristics.

If desired, the concentrated liquid flavorings can include additional components, such as salts, preservatives, viscosifiers, surfactants, stimulants, antioxidants, caffeine, electrolytes (including salts), nutrients (e.g., vitamins and minerals), stabilizers, gums, and the like. Preservatives, such as EDTA, sodium benzoate, potassium sorbate, sodium hexametaphosphate, nisin, natamycin, polylysine, and the like can be included, if desired, but are generally not necessary for shelf stability due to the reduced water activity and/or reduced pH of the flavoring.

By one optional approach, buffer can be added to the flavoring to provide for increased acid content at a desired pH. Use of buffer may be particularly desired for more concentrated products. Buffer can be added to the flavoring to adjust and/or maintain the pH of the flavoring. Depending on the amount of buffer used, a buffered flavoring may contain substantially more acid than a similar, non-buffered flavoring at the same pH. In one aspect, buffer may be included in an amount relative to the acidulant content. Suitable buffers include, for example, a conjugated base of an acid, gluconate, acetate, phosphate or any salt of an acid (e.g., sodium citrate and potassium citrate). In other instances, an undissociated salt of the acid can buffer the concentrate.

By virtue of balancing the amount of sweetener, water, flavoring, and optional non-aqueous liquid in the system, the concentrated liquid flavoring can be added to a beverage in a relatively small quantity to provide a desired amount of flavor to the beverage without imparting undesired sweetness to the beverage. In contrast, conventional liquid flavorings used by coffee shops generally need to be added to the beverage in much larger quantities to provide the same level of flavor to a beverage. For example, several conventional flavorings, such as those marketed under the TORANI® brand or Starbucks brand, have a serving size of 30 mL and contribute a large amount of sweetness to the beverage.

In some approaches, particularly with respect to the reduced water activity flavorings described herein, the concentrated liquid flavorings can be formulated to have increased viscosity relative to water. It has been found that hydrophobic ingredients, such as hydrophobic flavor components, are less likely to shock out of solution with increased product density relative to water.

For example, the concentrated liquid flavorings can be formulated to have Newtonian or non-Newtonian flow characteristics. Concentrated liquid flavorings that do not include gums or thickeners will have Newtonian flow characteristics, meaning that the viscosity is independent of the shear rate. Inclusion of, for example, xanthan or certain other gums or thickeners can create pseudo-plastic and shear thinning characteristics of the flavorings. A drop in viscosity as the shear rate increases indicates that shear thinning is occurring.

In one aspect, the density of a concentrated liquid flavoring is about 1.0 to about 1.3 at 20° C., such as using a Mettler-Toledo density meter. Generally the reduced pH flavorings have a density toward the lower end of that range and the reduced water activity flavorings have a density toward the upper end of that range.

In one aspect, the viscosity of a concentrated liquid flavoring having a reduced water activity, generally due to the large quantity of sweetener, can be in the range of about 1 to about 900 cP, in another aspect about 100 to about 600 cP, in another aspect about 400 to about 600 cP, and in another aspect about 500 to about 600 cP as measured with a Brookfield DV-II+ PRO viscometer with Enhanced UL (Ultra Low) Adapter with spindle code 00 at 20° C.

In another aspect, the viscosity of a concentrated liquid flavoring having a reduced pH, generally due to the large quantity of water, can be in the range of about 1 to about 900 cP, in another aspect about 1 to about 500 cP, in another aspect about 1 to about 100 cP in another aspect about 1 to about 25 cP, in another aspect about 1 to about 10 cP, in another aspect about 1 to about 5 cP as measured with a Brookfield DV-II+ PRO viscometer with Enhanced UL (Ultra Low) Adapter with spindle code 00 at 20° C.

If the viscosity of the either concentrated liquid flavoring with low pH or low water activity has a non-Newtonian liquid viscosity (shear rate dependent), the viscosity may be about 7.5 to about 10,000 cP, in another aspect about 100 to about 10,000 cP, in another aspect about 50 to about 10,000 cP, in another aspect about 10 to about 10,000 cP, in another aspect about 7.5 to about 5,000 cP, in another aspect about 7.5 to about 1000 cP, in another aspect about 7.5 to about 500 cP, in another aspect about 7.5 to about 200 cP, in another aspect about 7.5 to about 100 cP, in another aspect about 7.5 to about 50 cP, and in another aspect about 7.5 to about 40 cP. Viscosity is measured using Spindle S00 at 10 rpm at 20° C. with a Brookfield DVII+ Pro Viscometer; however, if the machine registers an error message using Spindle S00 for highly viscous concentrates, Spindle S06 at 10 rpm at 20° C. should be used.

Incorporation into Beverages

The concentrated liquid flavorings described herein can be added to beverages to add a desired amount of flavor to those beverages. In some aspects, the concentrated liquid flavorings may be non-potable, such as due to the intensity of flavor or sweetness for the low water activity embodiments. The concentrated liquid flavorings are generally not intended to be added to water to provide a flavored beverage. Instead, the concentrated liquid flavorings are primarily useful for adding a particular flavor or flavor profile to an existing beverage, such as a coffee or tea beverage. By some approaches, the concentrated flavoring can be added to the beverage without stirring.

While the concentrated liquid flavorings are designed primarily for use in beverages, other uses are also contemplated. For example, the flavorings described herein can be added to a variety of food products to add flavor to the food products. For example, the concentrates described herein can be used to provide flavor to a variety of solid, semi-solid, and liquid food products, including, for example, yogurt, ice cream, milk, Italian ice, sherbet, pudding, cake, and other desserts. Appropriate ratios of the flavoring to food product or beverage can readily be determined by one of ordinary skill in the art.

Packaging

The concentrated liquid flavorings provided herein, given the acidic pH or low water activity, do not require thermal treatments or mechanical treatments, such as pressure or ultrasound, to reduce microbial activity either before or after packaging. By one approach, the concentrated liquid flavorings are advantageously suitable for cold filling while maintaining microbial stability throughout the product's shelf life at room temperature. It is noted, however, that the compositions are not precluded from receiving such treatments either unless those treatments would adversely affect the stability of ingredients in the compositions. The packaging for the concentrates also generally does not require additional chemical or irradiation treatment. The product, processing equipment, package and manufacturing environment should be subject to good manufacturing practices but need not be subject to aseptic packaging practices. As such, the concentrated flavorings described herein can allow for reduced manufacturing costs.

The concentrated liquid flavorings described herein can be used with a variety of different types of containers. One exemplary container is described in WO 2011/031985, which is incorporated herein by reference in its entirety. Other types of containers can also be used, if desired. In one aspect, the concentrated liquid flavorings may be packaged in containers in an amount of about 1 to about 4 oz., in another aspect of about 1.25 to about 3 oz., in another aspect about 1.5 to about 2.0 oz., with said quantity being sufficient to make at least about 24 servings of flavored beverage.

Dispensing Flavoring into Beverages

When acidic liquids are mixed into beverages including protein-containing liquid, such as dairy liquids (e.g., milk, cream, half & half, or dairy creamer products) or milk substitutes (e.g., almond milk, soy milk, or other non-dairy milk substitutes), there is a risk that the beverage will curdle. Proteins in dairy liquids and milk substitutes will coagulate and curdle if they reach their isoelectric point. For example, the isoelectric point of casein is pH 4.6. The more acidic the liquid, the greater the likelihood that curdling will occur. For example, an acidic liquid of pH 4.0 will very likely result in curdling upon introduction of the liquid to the beverage due to local reduction of the pH of the beverage.

Conventional flavor syrups for use in coffee beverages often have an acidic pH (e.g., around 4.3). Generally, it is recommended to add these flavor syrup to the coffee prior to addition of milk or other dairy liquids. By doing so, the flavor syrup is first dispersed in the coffee, and the local effect of the syrup on pH reduction is minimized. The milk or other dairy liquid can then be added to the flavored coffee with reduced risk of curdling.

It has been surprisingly and unexpectedly found that mildly acidic liquids, such as concentrated liquid flavorings described herein having a pH around 3.8 to 4.5 can be added to a dairy-containing beverage (i.e., after the dairy liquid has been added to the beverage) if the concentrated liquid flavoring is added in a manner that allows the liquid to be rapidly dispersed in the beverage so as to minimize localized pH reduction upon adding the flavoring to the beverage.

By one approach, it was found that using a container or package that is configured to dispense the acidic flavoring in the form of a jet or powerful stream allows the beverage and flavoring to mix generally homogenously due to the force of the jet without requiring stirring, such as with a spoon, or shaking to promote mixing. When using this container, no curdling occurs even though addition of the same liquid flavoring by pouring, such as from a spoon, may result in curdling. One exemplary container is described in WO 2011/031985.

By one approach, the container or package used to dispense the flavoring has a self-mixing feature which allows the product to go into solution quickly so that curdling is substantially avoided. By avoidance of substantial curdling is meant that no coagulation occurs in the beverage that is visible to the naked eye. In this respect, the self-mixing component may include a nozzle member that allows one to dispense the flavoring in a strong jet or stream from the container or package. The nozzle member has an opening therein. A jet of the liquid concentrate is then dispensed from the container through the nozzle member, where the jet has a mass flow between 1.0 g/s and 3.0 g/s, or between 1.0 g/s and 1.5 g/s. A target liquid within a target container is then impacted by the jet such that the impact does not displace a significant amount of fluid from within the target container. The target liquid and the liquid concentrate are then mixed into a generally homogeneous mixture with the jet. Pressure to create the desired dispensing flow can be a function of the fluid viscosity. Exemplary valves are described in WO 2011/031985, including, for example, valves listed in Table 4 herein and LMS V25 Engine 0.070 X Slit from Liquid Molding Systems, Inc. ("LMS") of Midland, Mich.

Exemplary embodiments of a suitable container 10 are illustrated in FIGS. 1-6. In these embodiments, container 10 includes closure 16 which is a flip top cap having a base 24 and a cover 26. An underside of the base 24 defines an opening therein configured to connect to the second end 14 of the container 10 and fluidly connect to the interior of the container 10. A top surface 28 of the base 24 includes a spout 30 defining an outlet opening 31 extending outwardly therefrom. The spout 30 extends the opening defined by the underside of the base 24 to provide an exit or fluid flow path for the concentrated liquid flavoring 20 stored in the interior of the container 10.

Figure 3:
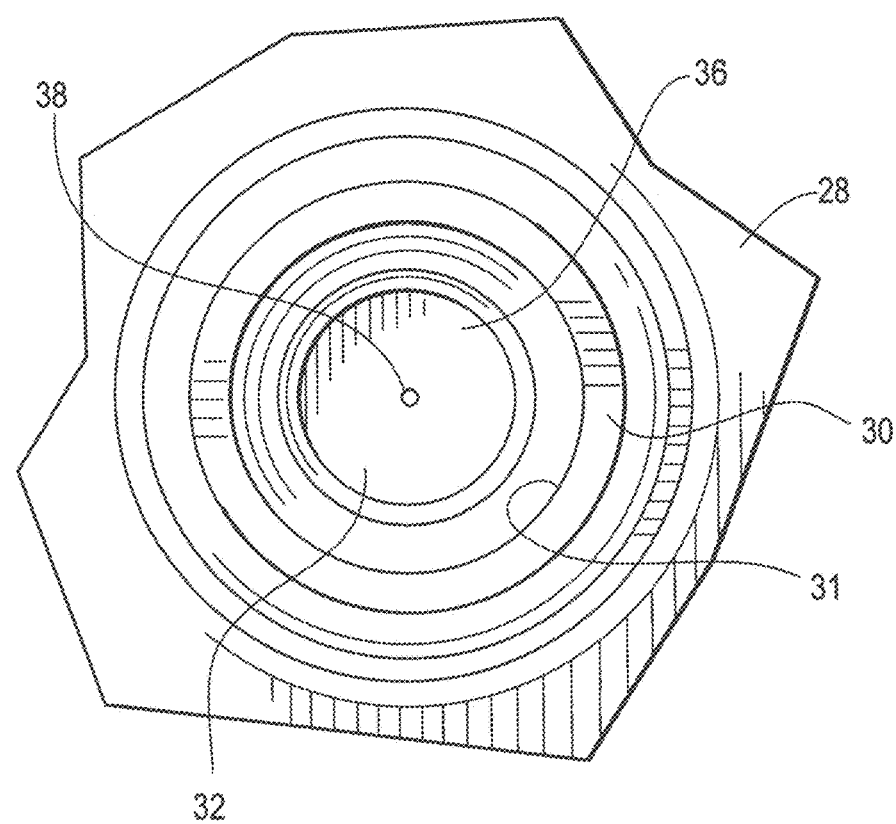
FIG. 3 is an enlarged top plan view of a spout and nozzle of the lid of FIG. 1.
Figure 4:
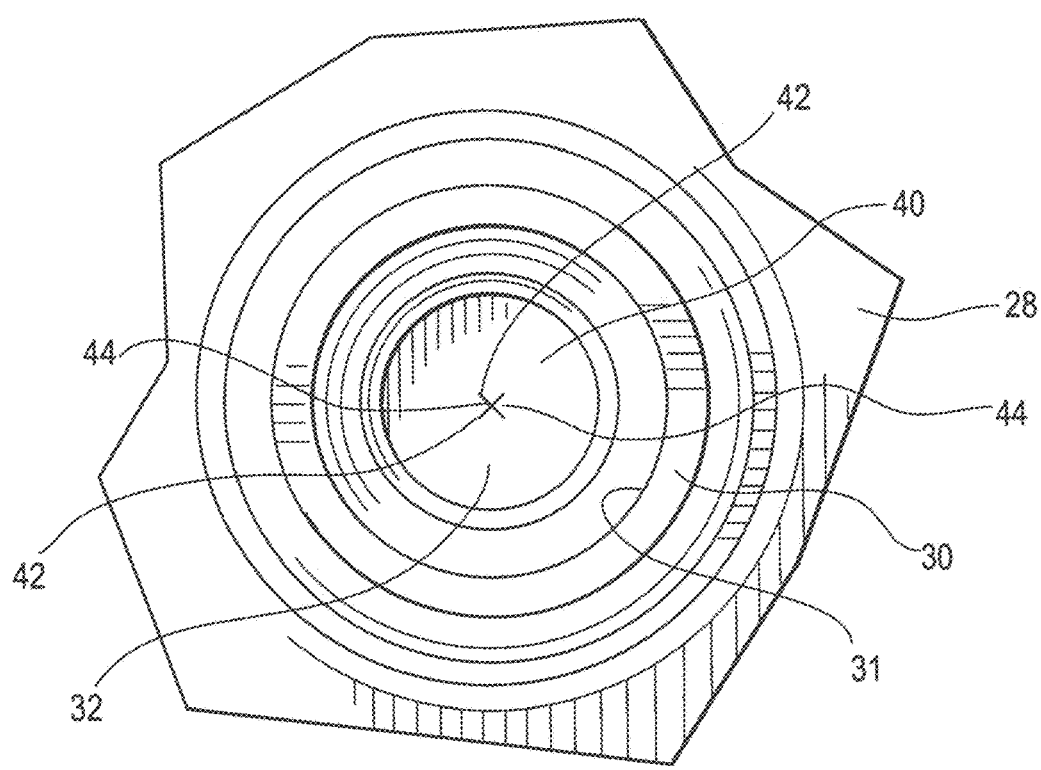
FIG. 4 is an enlarged top plan view of a spout and nozzle of the lid of FIG. 1.

By one approach, the spout 30 includes a nozzle 32 disposed therein, such as across the fluid flow path, that is configured to restrict fluid flow from the container 10 to form a jet 34 of concentrated liquid flavoring 20. FIGS. 3 and 4 illustrate example forms of the nozzle 32 for use in the container 10. In FIG. 3, the nozzle 32 includes a generally flat plate 36 having a hole, bore, or orifice 38 therethrough. The bore 38 may be straight edged or have tapered walls. Alternatively, as shown in FIG. 4, the nozzle 32 includes a generally flat, flexible plate 40, which may be composed of silicone or the like, having a plurality of slits 42 therein, and preferably two intersecting slits 42 forming four generally triangular flaps 44. So configured, when the container 10 is squeezed, such as by depressing the sidewall 18 at the recess 22, the concentrated liquid flavoring 20 is forced against the nozzle 32 which outwardly displaces the flaps 44 to allow the concentrated liquid flavoring 20 to flow therethrough. The jet 34 of concentrated liquid flavoring formed by the nozzle 32 combines velocity and mass flow to impact a target liquid 43 within a target container 45 to cause turbulence in the target liquid 43 and create a generally uniform mixed end product without the use of extraneous utensils or shaking.

The cover 26 of the closure 16 is generally dome-shaped and configured to fit over the spout 30 projecting from the base 24. In the illustrated form, the lid 26 is pivotably connected to the base 24 by a hinge 46. The lid 26 may further include a stopper 48 projecting from an interior surface 50 of the lid. Preferably, the stopper 48 is sized to fit snugly within the spout 30 to provide additional protection against unintended dispensing of the concentrated liquid flavoring 20 or other leakage. Additionally in one form, the lid 26 can be configured to snap fit with the base 24 to close off access to the interior 19 of the container 10. In this form, a recessed portion 52 can be provided in the base 24 configured to be adjacent the cover 26 when the cover 26 is pivoted to a closed position. The recessed portion 52 can then provide access to a ledge 54 of the cover 26 so that a user can manipulate the ledge 54 to open the cover 26.

Figure 10:
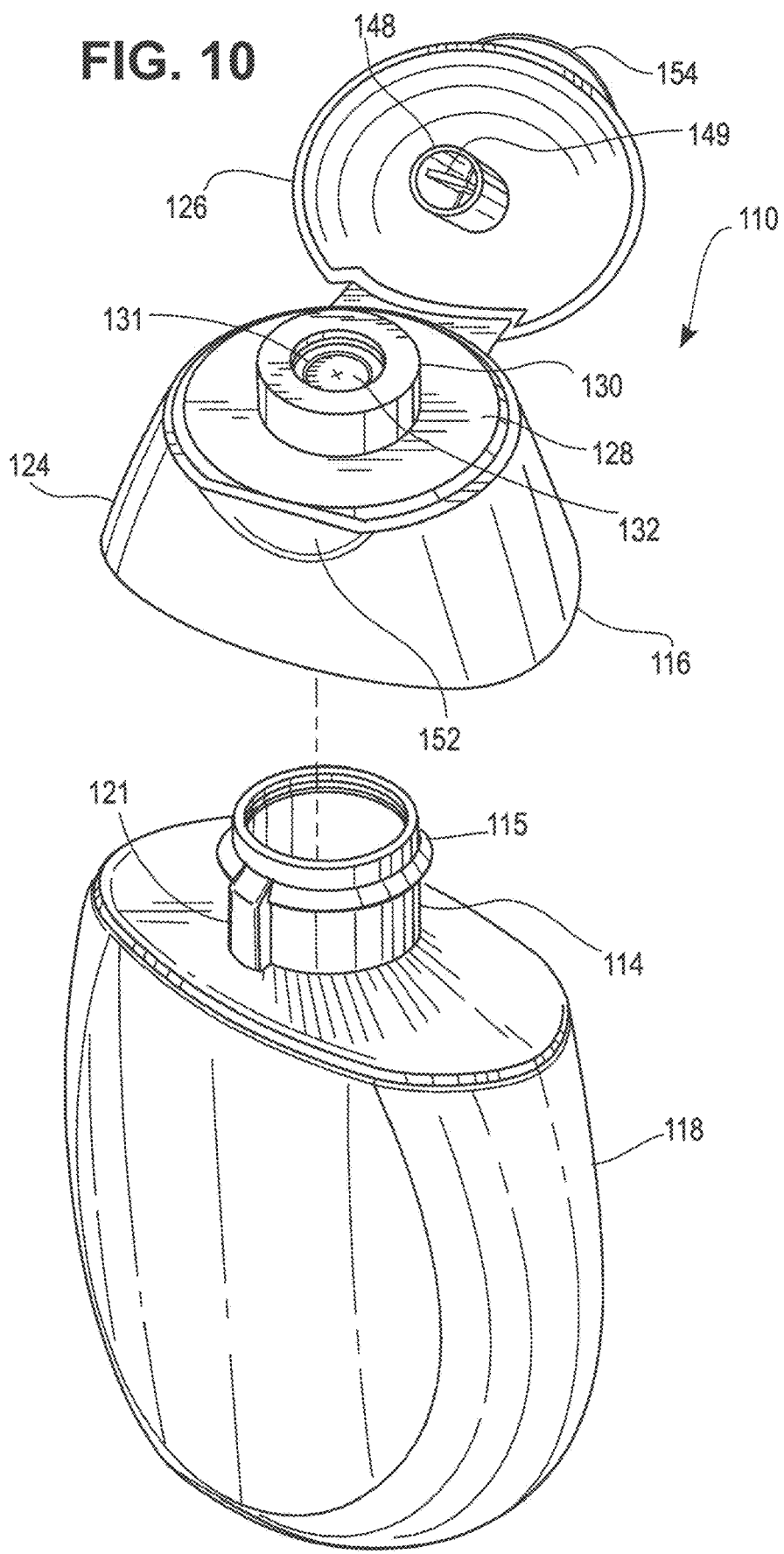
FIG. 10 is an exploded perspective view of a container and lid in accordance with another exemplary embodiment.
Figure 11:
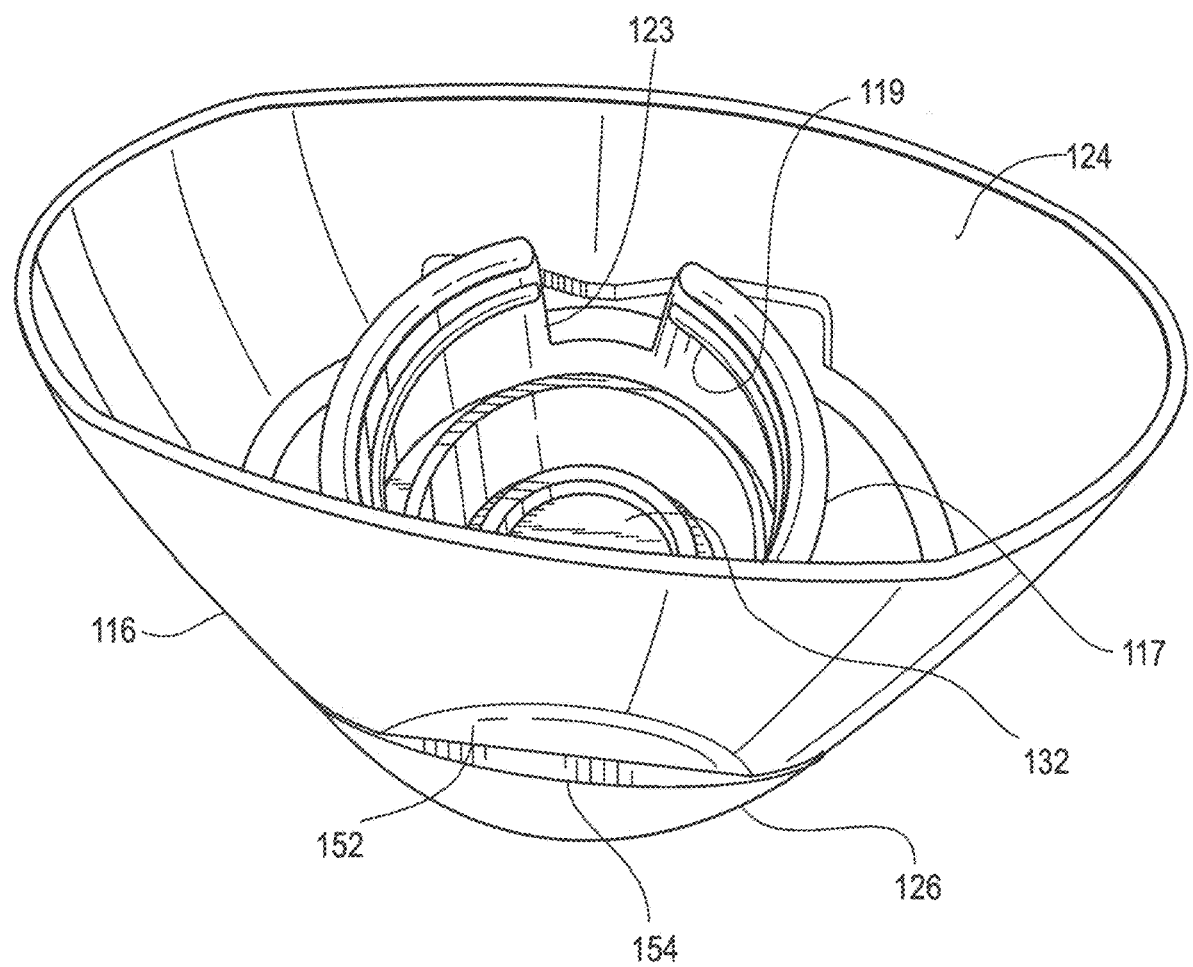
FIG. 11 is a perspective view of the underside of the lid of FIG. 10.

An alternative exemplary embodiment of a container 110 is similar to those of FIGS. 1-6, but includes a modified closure 116 and modified neck or second end 114 of the container 110 as illustrated in FIGS. 10 and 11. Like the foregoing embodiment, the closure of the alternative exemplary embodiment is a flip top cap having a base 124 and a hinged cover 126. An underside of the base 124 defines an opening therein configured to connect to the second end 114 of the container 110 and fluidly connect to the interior of the container 110. A top surface 128 of the base 124 includes a spout 130 defining an outlet opening 131 extending outwardly therefrom. The spout 130 extends from the opening defined by the underside of the base 124 to provide an exit or fluid flow path for the concentrated liquid flavoring stored in the interior of the container 110. The spout 130 includes a nozzle 132 disposed therein, such as across the fluid flow path, that is configured to restrict fluid flow from the container 110 to form a jet of concentrated liquid flavoring. The nozzle 132 can be of the types illustrated in FIGS. 3 and 4 and described herein.

Like the prior embodiment, the cover 126 of the closure 116 is generally dome shaped and configured to fit over the spout 130 projecting from the base 124. The lid 126 may further include a stopper 148 projecting from an interior surface 150 of the lid. Preferably, the stopper 148 is sized to snugly fit within the spout 130 to provide additional protection against unintended dispensing of the concentrated liquid flavoring or other leakage. The stopper 148 can be a hollow, cylindrical projection, as illustrated in FIGS. 10 and 11. An optional inner plug 149 can be disposed within the stopper 148 and may project further therefrom. The inner plug 149 can contact the flexible plate 40 of the nozzle 32 to restrict movement of the plate 40 from a concave orientation, whereby the flaps are closed, to a convex orientation, whereby the flaps are at least partially open for dispensing. The inner plug 149 can further restrict leakage or dripping from the interior of the container 110. The stopper 148 and/or plug 149 cooperate with the nozzle 132 and/or the spout 130 to at least partially block fluid flow.

The stopper 148 can be configured to cooperate with the spout 130 to provide one, two or more audible and/or tactile responses to a user during closing. For example, sliding movement of the rearward portion of the stopper 148 past the rearward portion of the spout 130—closer to the hinge—can result in an audible and tactile response as the cover 126 is moved toward a closed position. Further movement of the cover 126 toward its closed position can result in a second audible and tactile response as the forward portion of the stopper slides past a forward portion of the spout 130—on an opposite side of the respective rearward portions from the hinge. Preferably the second audible and tactile response occurs just prior to the cover 126 being fully closed. This can provide audible and/or tactile feedback to the user that the cover 126 is closed.

The cover 126 can be configured to snap fit with the base 124 to close off access to the interior of the container 110. In this form, a recessed portion 152 can be provided in the base 124 configured to be adjacent the cover 126 when the cover 126 is pivoted to a closed position. The recessed portion 152 can then provide access to a ledge 154 of the cover 126 so that a user can manipulate the ledge 154 to open the cover 126.

To attach the closure 116 to the neck 114 of the container 110, the neck 114 includes a circumferential, radially projecting inclined ramp 115. A skirt 117 depending from the underside of the base 124 of the closure 116 includes an inwardly extending rib 119. The rib 119 is positioned on the skirt 117 such that it can slide along and then to a position past the ramp 115 to attach the closure 116 to the neck 114. Preferably, the ramp 115 is configured such that lesser force is required to attach the closure 116 as compared to remove the closure 116. In order to limit rotational movement of the closure 116 once mounted on the container 110, one or more axially extending and outwardly projecting protuberances 121 are formed on the neck 114. Each protuberance 121 is received within a slot 123 formed in the skirt 117 of the closure 116. Engagement between side edges of the protuberance 121 and side edges of the slot 123 restrict rotation of the closure 116 and maintain the closure 116 in a preferred orientation, particularly suitable when portions of the closure 116 is designed to be substantially flush with the sidewall 118 of the container 110. In the exemplary embodiment of FIGS. 10 and 11, two protuberances 121 and two slots 123, each spaced 180 degrees apart.

The containers described herein may have resilient sidewalls that permit them to be squeezed to dispense the concentrated liquid flavoring or other contents. By resilient, it is meant that they return to or at least substantially return to their original configuration when no longer squeezed. Further, the containers may be provided with structural limiters for limiting displacement of the sidewall, i.e., the degree to which the sidewalls can be squeezed. This can advantageous contribute to the consistency of the discharge of contents from the containers. For example, the foregoing depression can function as a limiter, whereby it can contact the opposing portion of the sidewall to limit further squeezing of opposing sidewall portions together. The depth and/or thickness of the depression can be varied to provide the desired degree of limiting. Other structural protuberances of one or both sidewalls (such as opposing depressions or protuberances) can function as limiters, as can structural inserts.

Advantages and embodiments of the concentrated liquid flavoring compositions described herein are further illustrated by the following examples; however, the particular conditions, processing schemes, materials, and amounts thereof recited in these examples, as well as other conditions and details, should not be construed to unduly limit the compositions and methods described herein. All percentages and ratios in this application are by weight unless otherwise indicated.

EXAMPLES

Example 1

Reduced water activity concentrated liquid flavorings were prepared according to the formulas in Table 2 below.

TABLE 2

| | Amount (%) | | |
|---|---|---|---|
| Ingredient | A | B | C |
| Water | 15.0 | 17.9 | 12.9 |
| Fructose | 50.0 | 40.0 | |
| Sucrose | | | 45.0 |
| Xylitol | | 10.0 | 10.0 |
| Propylene Glycol | | | |
| Sucralose (25% solution) | | | |
| Flavor (contains ~60% PG) | 34.9 | 32.0 | 32.0 |
| Potassium sorbate (granules) | 0.1 | 0.1 | 0.1 |
| Brix | 57.1 | 46.5 | 36.9 |
| Acid | 0.010 | 0.008 | 0.009 |
| Specific Gravity | 1.27196 | 1.21295 | 1.16288 |
| Density | 1.27196 | 1.21295 | 1.16288 |
| TA | 0.2 | 0.2 | 0.2 |

Example 2

A concentrated liquid flavoring having a low pH was prepared according to the formula in Table 3 below.

TABLE 3

| Ingredient | Amount (%) |
| --- | --- |
| Water | 56.62 |
| Sodium acid sulfate | 0.08 |
| Sucralose (25% solution) | 0.3 |
| Flavor (contains ~60% PG) | 42.9 |
| Potassium sorbate (granules) | 0.1 |
| Brix | 8.8 |
| Acid | 0.001 |
| Specific Gravity | 1.03490 |
| Density | 1.03490 |
| TA | 0 |

Example 3

A concentrated liquid flavoring (2.2 g; pH 3.9) was added to brewed Gevalia Kenya coffee (240 g; pH 4.6) at a temperature of about 160° F. and 2 percent milk (15 g; pH 6.7) in a variety of ways to determine if the addition of the flavoring caused the milk to curdle. The flavoring was dispensed using a container having a nozzle as described in WO 2011/031985 or by pouring the flavoring from a spoon into the beverage.

Sample A: Coffee was poured into a cup, milk was poured into the coffee, and flavoring was dosed from the container into the coffee. No curdling occurred.

Sample B: Coffee was poured into a cup, milk was poured into the coffee, and flavoring was poured from a spoon into the coffee. No curdling occurred.

Sample C: Milk was poured into a cup, coffee was poured into the milk, and then the flavoring was dosed from the container into the coffee. No curdling occurred.

Sample D: Milk was poured into a cup, coffee was poured into the milk, and then the flavoring was poured from a spoon into the coffee. No curdling occurred.

Sample E: Milk was poured into the coffee and then flavoring was dosed from the container into the coffee. No curdling occurred.

Sample F: Milk was poured into the coffee and then flavoring was poured from a spoon into the coffee. The milk in the cup curdled.

Example 4

A concentrated liquid flavoring (2.2 g or 5.0 g; pH 4.2) was added to brewed Gevalia Kenya coffee (240 g; pH 4.6) at a temperature of about 160° F. and 2 percent milk (15 g; pH 6.7) in a variety of ways to determine if the addition of the flavoring caused the milk to curdle. Each experiment was performed twice, once using 2.2 g flavoring and the other using 5.0 g flavoring. The flavoring was dispensed using a container having a nozzle as described in WO 2011/031985.

Sample A: Coffee was poured into a cup, milk was poured into the coffee, and flavoring was dosed from the container into the coffee. No curdling occurred at either dose of flavoring.

Sample B: Milk was poured into a cup, coffee was poured into the milk, and then the flavoring was dosed from the container into the coffee. No curdling occurred at either dose of flavoring.

Sample C: Milk was poured into the coffee and then flavoring was dosed from the container into the coffee. No curdling occurred at either dose of flavoring.

Example 5

A concentrated liquid flavoring (2.2 g or 5.0 g; pH 4.2) was added to brewed Maxwell House Original coffee (240 g; pH 6.7) at a temperature of about 160° F. and 2 percent milk (15 g; pH 6.7) in a variety of ways to determine if the addition of the flavoring causes the milk to curdle. Each experiment was performed twice, once using 2.2 g flavoring and the other using 5.0 g flavoring. The flavoring was dispensed using a container having a nozzle as described in WO 2011/031985.

Sample A: Coffee was poured into a cup, milk was poured into the coffee, and flavoring was dosed from the container into the coffee. No curdling occurred at either dose of flavoring.

Sample B: Milk was poured into a cup, coffee was poured into the milk, and then the flavoring was dosed from the container into the coffee. No curdling occurred at either dose of flavoring.

Sample C: Milk was poured into the coffee and then flavoring was dosed from the container into the coffee. No curdling occurred at either dose of flavoring.

Example 6

Tests were performed using a variety of nozzles as the discharge opening in a container made from high-density polyethylene (HDPE) and ethylene vinyl alcohol (EVOH) with a capacity of approximately 60 cc. Table 4 below shows the nozzles tested and the abbreviation used for each.

TABLE 4

| Nozzles Tested | |
| --- | --- |
| Long Name | Abbreviation |
| SLA Square Edge Orifice 0.015" | O_015 |
| SLA Square Edge Orifice 0.020" | O_020 |
| SLA Square Edge Orifice 0.025" | O_025 |
| LMS V21 Engine 0.070" × Slit | V21_070 |
| LMS V21 Engine 0.100" × Slit | V21_100 |
| LMS V21 Engine 0.145" × Slit | V21_145 |
| LMS V21 Engine 0.200" × Slit | V21_200 |

The SLA Square Edge Orifice nozzles each have a front plate with a straight-edged circular opening therethrough, and were made using stereolithography. The number following the opening identification is the approximate diameter of the opening. The LMS refers to a silicone valve disposed in a nozzle having an X shaped slit therethrough, and is available from Liquid Molding Systems, Inc. ("LMS") of Midland, Mich. The slit is designed to flex to allow product to be dispensed from the container and at least partially return to its original position to seal against unwanted flow of the liquid through the valve. This advantageously protects against dripping of the liquid stored in the container. The number following is the approximate length of each segment of the X slit. When combined with the containers described herein, the valve is believed to permit atmospheric gasses to flow into the container body during a cleaning phase when the squeeze force is released effective to clean the valve and upstream portions of an exit path through the container and/or closure. Further, such a combination is believed to provide for controllable flow of the liquid when the valve is generally downwardly directed such that gases which enter during the cleaning phase are remote from the exit path. Another suitable valve is the LMS V25 Engine 0.070 X Slit.

An important feature for the nozzle is the ability to mix the dispelled concentrated liquid flavoring with the target liquid using only the force created by spraying the concentrated liquid flavoring into the water. Acidity (pH) levels can be utilized to evaluate how well two liquids have been mixed. A jet of the dispensed liquid, however, tends to shoot to the bottom of the target container and then swirl back up to the top of the target liquid, which greatly reduces the color difference between the bands. Advantageously, pH levels can also be utilized in real time to determine mixture composition. Testing included dispensing 4 cc of an exemplary liquid in 500 ml of DI $H_2O$ at room temperature of 25° C. The pour was done from a small shot glass, while the jet was produced by a 6 cc syringe with an approximately 0.050 inch opening. Mixing refers to a Magnastir mixer until steady state was achieved.

TABLE 5 pH Mixing Data

| | Pour | | | | Jet | | | | | |
|---|---|---|---|---|---|---|---|---|---|---|
| | Rep 1 | | Rep 2 | | Slow (~1.5 s) | | Med (~1 s) | | Fast (~0.5 s) | |
| Time | Bottom | Top | Bottom | Top | Bottom | Top | Bottom | Top | Bottom | Top |
| 0 | 5.42 | 5.34 | 5.40 | 5.64 | 5.50 | 5.54 | 5.54 | 5.48 | 5.56 | 5.59 |
| 5 | 3.57 | 4.90 | 3.52 | 5.00 | 3.19 | 4.10 | 3.30 | 3.70 | 2.81 | 2.90 |
| 10 | 3.37 | 4.70 | 3.33 | 4.80 | 2.97 | 3.20 | 3.25 | 3.45 | 2.78 | 2.80 |
| 15 | 3.33 | 4.70 | 3.22 | 4.70 | 3.00 | 3.10 | 3.27 | 3.40 | 2.77 | 2.78 |
| 20 | 3.32 | 4.60 | 3.16 | 4.70 | 3.01 | 3.10 | 3.13 | 3.30 | 2.75 | 2.80 |
| 25 | 3.31 | 4.60 | 3.12 | 4.70 | 3.01 | 3.08 | 3.08 | 3.20 | 2.74 | 2.80 |
| 30 | 3.31 | 4.50 | 3.10 | 4.70 | 3.01 | 3.07 | 3.06 | 3.18 | 2.73 | 2.75 |
| 35 | 3.30 | 4.30 | 3.09 | 4.70 | 3.00 | 3.06 | 3.05 | 3.17 | 2.72 | 2.75 |
| 40 | 3.28 | 4.25 | 3.10 | 4.70 | 3.00 | 3.07 | 3.06 | 3.17 | 2.71 | 2.70 |
| Mixed | 2.78 | | 2.70 | | 2.67 | | 2.70 | | 2.65 | |

After forty seconds, the pour produces results of pH 3.28 on the bottom and pH 4.25 on the top in the first rep and pH 3.10 and 4.70 on the top in the second rep. The jet, however, was tested using a slow, a medium, and a fast dispense. After forty seconds, the slow dispense resulted in pH 3.07 on the bottom and pH 3.17 on the top, the medium dispense resulted in pH 3.06 on the bottom and pH 3.17 on the top, and the fast dispense resulted in pH 2.71 on the bottom and pH 2.70 on the top. Accordingly, these results show the effectiveness of utilizing a jet to mix a concentrated liquid flavoring with the target liquid. In some approaches, an effective jet of dispensed liquid can therefore provide a mixture having a variance of pH between the top and the bottom of a container of less than about 0.3. In fact, this result was achieved within 10 seconds of dispense.

Accordingly, each nozzle was tested to determine a Mixing Ability Value. The Mixing Ability Value is a visual test measured on a scale of 1-4 where 1 is excellent, 2 is good, 3 is fair, and 4 is poor. Poor coincides with a container having unmixed layers of liquid, i.e., a water layer resting on the concentrated liquid flavoring layer, or an otherwise inoperable nozzle. Fair coincides with a container having a small amount of mixing between the water and the concentrated liquid flavoring, but ultimately having distinct layers of concentrated liquid flavoring and water, or the nozzle operates poorly for some reason. Good coincides with a container having desirable mixing over more than half of the container while also having small layers of water and concentrated liquid flavoring on either side of the mixed liquid. Excellent coincides with a desirable and well mixed liquid with no significant or minor, readily-identifiable separation of layers of concentrated liquid flavoring or water.

The test dispensed 4 cc of a colored liquid, which contained 125 g citric acid in 500 g H20, 5 percent SN949603 (Flavor), and 1.09 g/cc Blue #2 into a glass 250 ml Beaker having 240 ml of water therein. The liquid had a viscosity of approximately 4 centipoises. Table 6A below shows the results of the mixing test and the Mixing Ability Value of each nozzle.

TABLE 6A

Mixing Ability Value of each nozzle

| Nozzle | Mixing Ability Value |
|---|---|
| O_015 | 3 |
| O_020 | 2 |

TABLE 6A-continued

Mixing Ability Value of each nozzle

| Nozzle | Mixing Ability Value |
|---|---|
| O_025 | 1 |
| V21_070 | 1 |
| V21_100 | 1 |
| V21_145 | 2 |
| V21_200 | 2 |

As illustrated in FIG. 7, a representation of the resulting beaker of the mixing ability test for each tested nozzle is shown. Dashed lines have been added to indicate the approximate boundaries between readily-identifiable, separate layers. From the above table and the drawings in FIG. 7, the 0.025 inch diameter Square Edge Orifice, the 0.070 inch X Slit, and the 0.100 inch X Slit all produced mixed liquids with an excellent Mixing Ability Value where the beaker displayed a homogeneous mixture with a generally uniform color throughout. The 0.020 inch diameter Square Edge Orifice, the 0.145 inch X Slit, and the 0.200 inch X Slit produced mixed liquids with a good Mixing Ability Value, where there were small layers of water and colored liquid visible after the 4 cc of colored liquid had been dispensed. The 0.015 inch Square Edge Orifice produced a mixed liquid that would have qualified for a good Mixing Ability Value, but was given a poor Mixing Ability Value due to the amount of time it took to dispense the 4 cc of colored liquid, which was viewed as undesirable to a potential consumer.

Another test measured the Mixing Ability Value based upon the squeeze pressure by injecting a pulse of air into the container with various valve configurations. More specifically, the test was performed for a calibrated "easy," "medium," and "hard" simulated squeeze. A pulse of pressurized air injected into the container simulates a squeeze force (although the test does not actually squeeze the sidewalls). At the start of every test repetition, an air pressure regulator is set to the desired pressure. The output from the air pressure regulator is connected via tubing to a pressure tight fitting set into an aperture formed in the center portion of the bottom of the container. The container can be between about 10 degrees and 0 degrees from vertical. About 2 feet of 5/32" tubing extends from a pneumatic push button valve downstream of the air pressure regulator to the pressure tight fitting. The container is filled for each test to its preferred maximum volume (which can be less than the total volume of the container). The push button is depressed a time calculated to result in a target dosage volume. The nozzle of the container is disposed between 2 and 4 inches above the target. This same protocol was used to determine other parameters associated with simulated squeezes, discussed herein.

The results are consistent with the actual squeeze testing, and show that the larger X Slit nozzles cause more splashing. For the simulated squeeze examples herein, the time was that required to dispense 4 cc of liquid from a container having about 49 cc of liquid in a total volume of about 65 cc. The container had the shape similar to that illustrated in FIG. 6, a 24-410 screw cap for holding the nozzle, a high density polyethylene wall with a thickness of about 0.03 inches, a span from the bottom of the container to the valve of about 3 inches, a thickness of about 1.1 thick and about 2.25 inches at maximum width with a neck of about an inch in diameter. The concentrate had a density of about 1.1 gm/cc, 4 cP and color sufficient to provide an indication of color in the final beverage. The results of the simulated Mixing Ability Value are set forth in below Table 6B.

TABLE 6B

Mixing Ability Value of each nozzle (simulated squeeze)

| Nozzle | Easy Squeeze Pressure (40) (inch WC) | Medium Squeeze Pressure (60) (inch WC) | Hard Squeeze Pressure (100) (inch WC) | Average Mixing Ability Value |
|---|---|---|---|---|
| O_015 | 1 | 2 | 2 | 1.67 |
| O_020 | 2 | 2 | 1 | 1.67 |
| O_025 | 2 | 1 | 1 | 1.33 |
| V21_070 | 3 | 2 | 1 | 2.00 |
| V21_100 | 2 | 1 | 1 | 1.33 |
| V21_145 | 3 | 1 | 1 | 1.67 |
| V21_200 | 1 | 1 | 1 | 1.00 |

The average velocity of each nozzle was then calculated using both an easy and a hard force. For each nozzle, a bottle with water therein was positioned horizontally at a height of 7 inches from a surface. The desired force was then applied and the distance to the center of the resulting water mark was measured within 0.25 ft. Air resistance was neglected. This was performed three times for each nozzle with both forces. The averages are displayed in Table 7 below.

TABLE 7

The average velocity calculated for each nozzle using an easy force and a hard force

| Nozzle | Velocity (mm/s) (Easy) | Velocity (mm/s) (Hard) |
|---|---|---|
| O_015 | 5734 | 7867 |
| O_020 | 6000 | 8134 |
| O_025 | 6400 | 7467 |
| V21_070 | 6400 | 7467 |
| V21_100 | 5600 | 8134 |
| V21_145 | 4934 | 6134 |
| V21_200 | 4000 | 5334 |

Each nozzle was then tested to determine how many grams per second of liquid are dispensed through the nozzle for both the easy and hard forces. The force was applied for three seconds and the mass of the dispelled fluid was weighed. This value was then divided by three to find the grams dispelled per second. Table 8 below displays the results.

TABLE 8

Mass flow for easy and hard forces for each nozzle

| Nozzle | Mass Flow (g/s) (Easy) | Mass Flow (g/s) (Hard) |
|---|---|---|
| O_015 | 0.66 | 0.83 |
| O_020 | 1.24 | 1.44 |
| O_025 | 1.38 | 1.78 |
| V21_070 | 1.39 | 2.11 |
| V21_100 | 2.47 | 3.75 |
| V21_145 | 2.36 | 4.16 |
| V21_200 | 2.49 | 4.70 |

Figure 8:
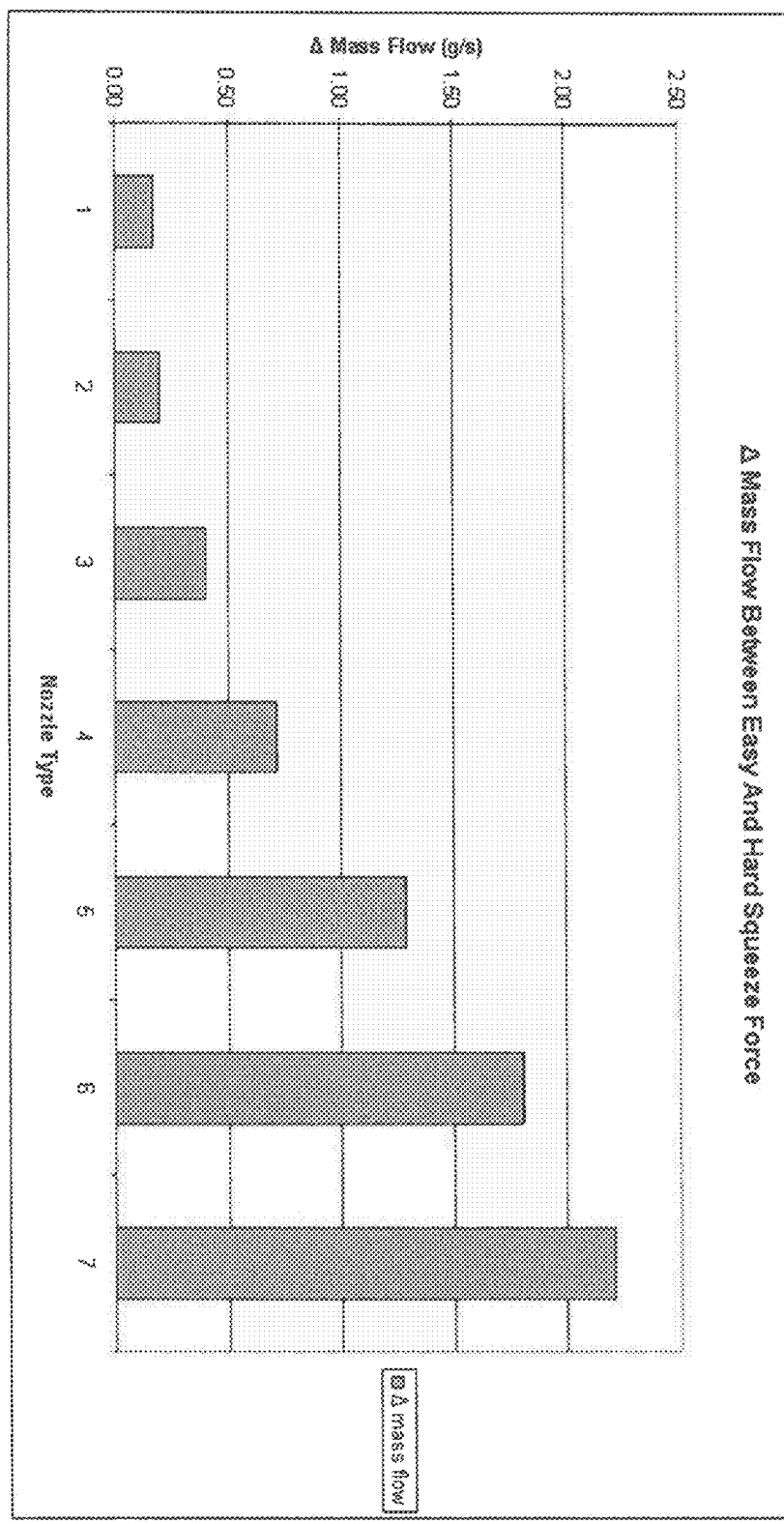
FIG. 8 is a graph showing the difference of the Mass Flow between easy and hard forces for tested nozzles.

As illustrated in FIG. 8, the graph shows the difference of the mass flow between the easy and hard forces for each of the nozzles. When applied to a concentrated liquid flavoring setting, a relatively small delta value for mass flow is desirable because this means that a consumer will dispense a generally equal amount of concentrated liquid flavoring even when differing squeeze forces are used. This advantageously supplies an approximately uniform mixture amount, which when applied in a beverage setting directly impacts taste, for equal squeeze times with differing squeeze forces. As shown, the 0.100 inch, the 0.145 inch, and the 0.200 inch X Slit openings dispense significantly more grams per second, but also have a higher difference between the easy and hard forces, making a uniform squeeze force more important when dispensing the product to produce consistent mixtures.

The mass flow for each nozzle can then be utilized to calculate the time it takes to dispense 1 cubic centimeter (cc) of liquid. The test was performed with water, which has the property of 1 gram is equal to 1 cubic centimeter. Accordingly, one divided by the mass flow values above provides the time to dispense 1 cc of liquid through each nozzle. These values are shown in Table 9A below.

TABLE 9A

Time to Dispense 1 cubic centimeter of liquid for easy and hard forces for each nozzle

| Nozzle | Time to Dispense 1 cc (s) (Easy) | Time to Dispense 1 cc (s) (Hard) |
|---|---|---|
| O_015 | 1.52 | 1.20 |
| O_020 | 0.81 | 0.69 |

TABLE 9A-continued

Time to Dispense 1 cubic centimeter of liquid for easy and hard forces for each nozzle

| Nozzle | Time to Dispense 1 cc (s) (Easy) | Time to Dispense 1 cc (s) (Hard) |
|---|---|---|
| O_025 | 0.72 | 0.56 |
| V21_070 | 0.72 | 0.47 |
| V21_100 | 0.40 | 0.27 |
| V21_145 | 0.42 | 0.24 |
| V21_200 | 0.40 | 0.21 |

Ease of use testing showed that a reasonable range of time for dispensing a dose of liquid is from about 0.3 seconds to about 3.0 seconds, which includes times that a consumer can control dispensing the concentrated liquid flavoring or would be willing to tolerate to get a reasonably determined amount of the concentrated liquid flavoring. A range of about 0.5 sec per cc to about 0.8 sec per cc provides a sufficient amount of time from a user reaction standpoint, with a standard dose of approximately 2 cc per 240 ml or approximately 4 cc for a standard size water bottle, while also not being overly cumbersome by taking too long to dispense the standard dose. The 0.020 inch Square Edge Orifice, the 0.025 inch Square Edge Orifice, and the 0.070 inch X Slit reasonably performed within these values regardless of whether an easy or a hard force was utilized. A dispense test and calculations were performed using "easy," "medium," and "hard" air injections to simulate corresponding squeeze forces in order to calculate the amount of time required to dispense 4 cc of beverage concentrate from a container having about 49 cc of concentrate in a total volume of about 65 cc. First, the mass flow rate is determined by placing the container upside-down and spaced about 6 inches above a catchment tray disposed on a load cell of an Instron. The aforementioned pressure application system then simulates the squeeze force for an "easy," "medium," and "hard" squeeze. The output from the Instron can be analyzed to determine the mass flow rate. Second, the mass flow rate can then be used to calculate the time required to dispense a desired volume of concentrate, e.g., 2 cc, 4 cc, etc.

Generally, the dispense time should not be too long (as this can disadvantageously result in greater variance and less consistency in the amount dispensed) nor should the dispense time be too short (as this can disadvantageously lead to an inability to customize the amount dispensed within a reasonable range). The time to dispense can be measured on a scale of 1 to 4, where 1 is a readily controllable quantity or dose that is of sufficient duration to permit some customization without too much variation (e.g., an average of between 1-3 seconds for 4 cc); 2 is a dose that is of slightly longer or shorter duration but is still controllable (e.g., an average of between 0.3 and 1 or between 3 and 4 seconds for 4 cc); 3 is a dose that is difficult to control given that it is either too short or too long in duration, permitting either minimal opportunity for customization or too large of an opportunity for customization (e.g., an average of about 0.3 (with some but not all datapoints being less than 0.3) or between about 4 and 10 for 4 cc); and 4 is a dose that is even more difficult to control for the same reasons as for 3 (e.g., an average of less than 0.3 (with all datapoints being less than 0.3) or greater than 10 seconds for 4 cc). The resulting Dispense Time Rating is then determined based upon an average of the "easy," "medium," and "hard" simulated squeezes. The results set forth in Table 9B.

TABLE 9B

Time to dispense 4 cc of beverage concentrate (simulated squeeze)

| Nozzle | Easy Squeeze Pressure (40) (inch WC) | Medium Squeeze Pressure (60) (inch WC) | Hard Squeeze Pressure (100) (inch WC) | Average Time | Rating |
|---|---|---|---|---|---|
| O_015 | 13.3 | 13.3 | 6.7 | 11.1 | 4 |
| O_020 | 4.0 | 3.3 | 2.9 | 3.4 | 2 |
| O_025 | 2.5 | 2.5 | 2.0 | 2.3 | 1 |
| V21_070 | 3.3 | 2.0 | 1.3 | 2.2 | 1 |
| V21_100 | 0.5 | 0.4 | .2 | 0.3 | 2 |
| V21_145 | 0.3 | <0.3 | <0.3 | 0.3 | 3 |
| V21_200 | <0.3 | <0.3 | <0.3 | <0.3 | 4 |

The SLA nozzle circular opening areas were calculated using $\pi r^2$. The areas of the X Slits were calculated by multiplying the calculated dispense quantity by one thousand and dividing by the calculated velocity for both the easy and the hard force.

Finally, the momentum-second was calculated for each nozzle using both the easy and the hard force. This is calculated by multiplying the calculated mass flow by the calculated velocity. Table 10A below displays these values.

TABLE 10A

Momentum-second of each nozzle for easy and hard forces (actual squeeze)

| Nozzle | Momentum * Second (Easy) | Momentum * Second (Hard) |
|---|---|---|
| O_015 | 3803 | 6556 |
| O_020 | 7420 | 11686 |
| O_025 | 8854 | 15457 |
| V21_070 | 8875 | 15781 |
| V21_100 | 13852 | 30502 |
| V21_145 | 11660 | 25496 |
| V21_200 | 9961 | 25068 |

The momentum-second of each nozzle was also determined using the above-referenced procedure for generating "easy," "medium," and "hard" simulated squeezes using a pulse of pressurized air. The mass flow rate (set forth in Table 10B) was multiplied by the velocity (set forth in Table 10C) to provide the momentum-second for the simulated squeezes (set forth in Table 10D).

TABLE 10B

Mass flow rate (g/s) of each nozzle for simulated squeezes

| Nozzle | Easy Squeeze Pressure (40) (inch WC) | Medium Squeeze Pressure (60) (inch WC) | Hard Squeeze Pressure (100) (inch WC) | Average Mass Flow Rate (g/s) |
|---|---|---|---|---|
| O_015 | 0.3 | 0.3 | 0.6 | 0.4 |
| O_020 | 1.0 | 1.2 | 1.4 | 1.2 |
| O_025 | 1.6 | 1.6 | 2.0 | 1.7 |
| V21_070 | 1.2 | 2.0 | 3.0 | 2.1 |
| V21_100 | 8.0 | 11.3 | 25 | 14.8 |
| V21_145 | 14.0 | X | X | X |
| V21_200 | X | X | X | X |

TABLE 10C

Initial Velocity (mm/s) of each nozzle for simulated squeezes

| Nozzle | Easy Squeeze Pressure (40) (inch WC) | Medium Squeeze Pressure (60) (inch WC) | Hard Squeeze Pressure (100) (inch WC) | Average Initial Velocity (mm/s) |
|---|---|---|---|---|
| O_015 | 2400 | 4000 | 5600 | 4000 |
| O_020 | 4000 | 5600 | 7200 | 5600 |
| O_025 | 4000 | 4800 | 6000 | 4934 |
| V21_070 | 4400 | 5200 | 7600 | 5734 |
| V21_100 | 4400 | 4800 | 6400 | 5200 |
| V21_145 | 4000 | 4800 | 6400 | 5067 |
| V21_200 | 4000 | 4800 | 5600 | 4800 |

TABLE 10D

Momentum-second of each nozzle for easy, medium and hard simulated squeezes

| Nozzle | Easy Squeeze Pressure (40) (inch WC) | Medium Squeeze Pressure (60) (inch WC) | Hard Squeeze Pressure (100) (inch WC) | Average Momentum * Second |
|---|---|---|---|---|
| O_015 | 720 | 1200 | 3360 | 1760 |
| O_020 | 4000 | 6720 | 10081 | 6934 |
| O_025 | 6400 | 7680 | 12001 | 8694 |
| V21_070 | 5280 | 10401 | 22801 | 12827 |
| V21_100 | 35202 | 54403 | 160010 | 83205 |
| V21_145 | 56003 | X | X | X |
| V21_200 | X | X | X | X |

Momentum-second values correlate to the mixing ability of a jet of liquid exiting a nozzle because it is the product of the mass flow and the velocity, so it is the amount and speed of liquid being dispensed from the container. Testing, however, has shown that a range of means that a consumer will dispense a generally equal amount of concentrated liquid flavoring even when differing squeeze forces are used. This advantageously supplies an approximately uniform mixture for equal squeeze times with differing squeeze forces. The results for the actual and simulated squeezes are consistent. As shown above, mimicking the performance of an orifice with a valve can result in more consistent momentum-second values for easy versus hard squeezes, as well as for a range of simulated squeezes, while also providing the anti-drip functionality of the valve.

Figure 9:
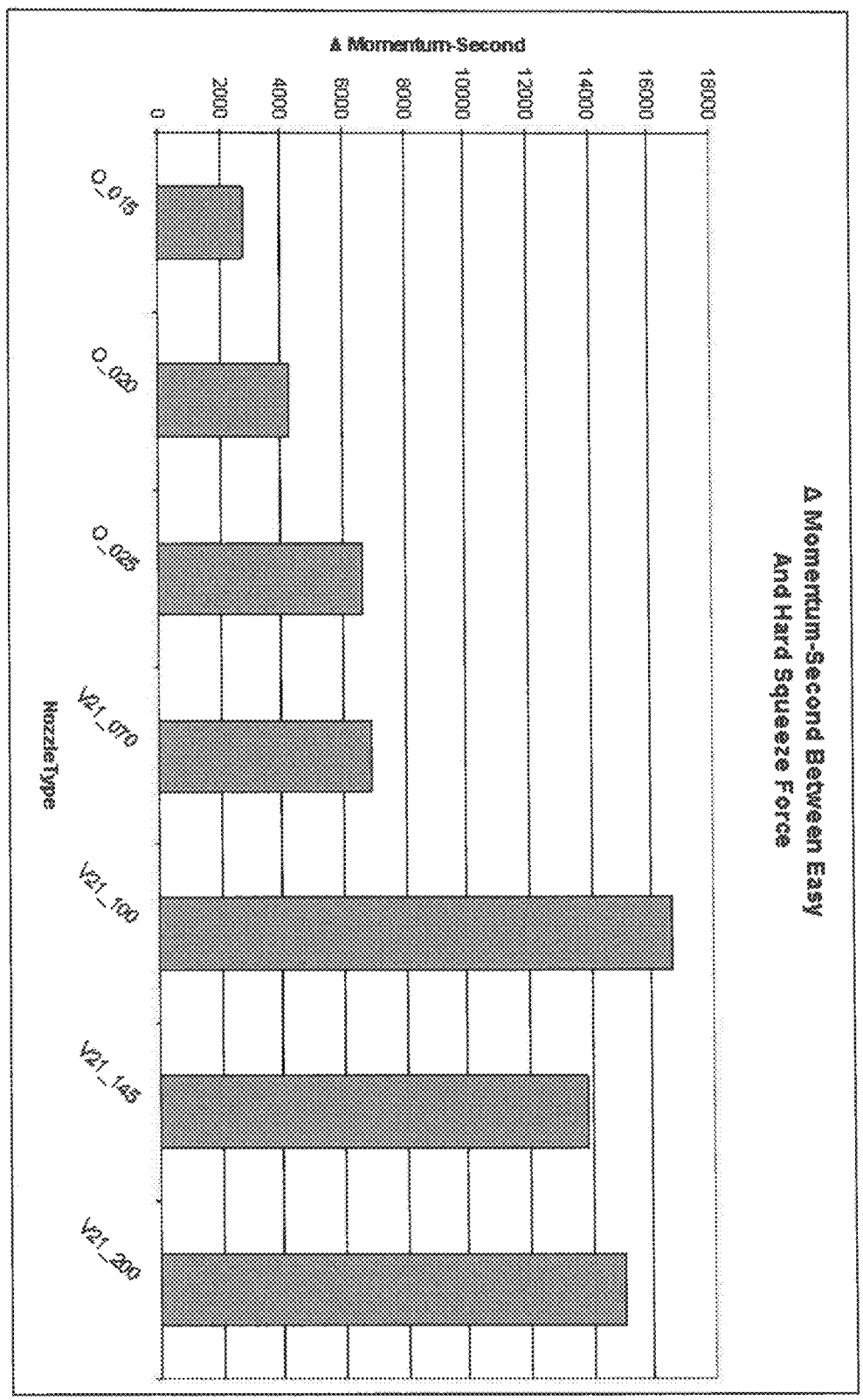
FIG. 9 is a graph showing the difference of the Momentum-Second between easy and hard forces for tested nozzles.

As illustrated in FIG. 9, the graph shows the difference for the Momentum-Second values between the easy and hard forces for each nozzle. When applied to a concentrated liquid flavoring setting, momentum-second having a relatively small delta value for Momentum-Second is desirable because a delta value of zero coincides with a constant momentum-second regardless of squeeze force. A delta momentum-second value of less than approximately 10,000, and preferably 8,000 provides a sufficiently small variance in momentum-second between an easy force and a hard force so that a jet produced by a container having this range will have a generally equal energy impacting a target liquid, which will produce a generally equal mixture. As shown, all of the Orifice openings and the 0.070 inch X Slit produced a Δ momentum-second that would produce generally comparable mixtures whether utilizing a hard force and an easy force. Other acceptable delta momentum-second values can be about 17,000 or less, or about 12,000 or less.

The foregoing descriptions are not intended to represent the only forms of the concentrated liquid flavorings in regard to the details of formulation. The percentages provided herein are by weight unless stated otherwise. Changes in form and in proportion of parts, as well as the substitution of equivalents, are contemplated as circumstances may suggest or render expedient. Similarly, while beverage concentrates and methods have been described herein in conjunction with specific embodiments, many alternatives, modifications, and variations will be apparent to those skilled in the art in light of the foregoing description.

What is claimed is:

1. A method of preparing a flavored beverage using a concentrated acidic liquid flavoring without causing curdling in the flavored beverage, the method comprising:
dispensing a jet of concentrated acidic liquid flavoring into a beverage from a container having a nozzle, the nozzle configured to provide a mass flow between 1.0 g/s and 5 g/s to rapidly mix the concentrated acidic liquid flavoring with the beverage without causing curdling in the beverage, wherein the beverage includes a protein-containing liquid, and the concentrated acidic liquid flavoring comprises:
about 10 to about 45 wt. percent water;
about 3 to about 40 wt. percent flavor component; and
less than about 2.0 wt. percent acidulant, the amount of acidulant effective to provide the concentrated liquid flavoring with a pH of about 3.8 to about 4.5, and
wherein the concentrated acidic liquid flavoring is dispensed into the beverage to dilute the concentrated acidic liquid flavoring by a factor of about 40 to about 160 times.

2. The method of claim 1, wherein the mixing of the beverage and the concentrated acidic liquid flavoring with the jet includes mixing the beverage and the concentrated acidic liquid flavoring into a generally homogenous mixture having a delta pH of 0.3 between the bottom and the top of the beverage in a target container within 10 seconds of the jet impacting the beverage.

3. The method of claim 1, wherein the mixing of the beverage and the concentrated acidic liquid flavoring with the jet produces a Mixing Ability Value of less than 3.

4. The method of claim 1, wherein dispensing the jet of the concentrated acidic liquid flavoring from the container through the nozzle has a mass flow between 1.0 g/s and 5 g/s and includes dispensing a dose of the concentrated acidic liquid flavoring within 0.3 seconds to 3.0 seconds.

5. The method of claim 1, wherein the nozzle is configured to provide a mass flow between 1.0 g/s and 1.5 g/s.

6. The method of claim 1, wherein the flavoring further comprises less than about 30 wt. percent non-aqueous liquid.

7. The method of claim 1, wherein the flavor component comprises one or more flavor keys and the total amount of flavor key in the concentrated acidic liquid flavoring is about 0.1 to about 10.0 percent flavor key by weight of the flavoring.

8. The method of claim 1, wherein the flavoring has a pH of about 4.0 to about 4.5.

9. The method of claim 1, wherein the flavoring has a pH of about 4.0 to about 4.2.

10. The method of claim 1, wherein the protein-containing liquid is a dairy liquid and/or dairy milk substitute.

11. The method of claim 10, wherein the dairy liquid comprises at least one of milk, cream, half and half, and dairy creamer.

12. The method of claim 10, wherein the dairy milk substitute comprises at least one of almond milk or soy milk.

13. The method of claim 10, wherein a squeeze force of 40-100 inch WC on the container produces a mass flow of concentrated acidic liquid flavoring of 1.0-1.5 g/s.

14. The method of claim 10, wherein the concentrated acidic liquid flavoring comprises about 0.02 wt. % to about 1.0 wt. % acidulant.

15. The method of claim 10, wherein the concentrated acidic liquid flavoring comprises one or more flavor keys and the total amount of flavor keys is about 0.1 wt. % to about 20 wt. %.

16. A method of preparing a flavored beverage using a concentrated acidic liquid flavoring without causing curdling in the flavored beverage, the method comprising:

dispensing a jet of concentrated acidic non-dairy liquid flavoring into a beverage from a container having a nozzle, the nozzle configured to provide a mass flow between 1.0 g/s and 5 g/s to rapidly mix the concentrated acidic liquid flavoring with the beverage without causing curdling in the beverage, wherein the beverage comprises a dairy liquid;

wherein the concentrated acidic liquid flavoring comprises about 10 to about 45 wt. percent water, about 3 to about 40 wt. percent flavor component comprising about 0.1 wt. % to about 20 wt. % flavor key, and less than about 2.0 wt. percent acidulant, the amount of acidulant effective to provide the concentrated liquid flavoring with a pH of about 3.8 to about 4.5.

17. The method of claim 16, wherein a squeeze force of 40-100 inch WC on the container produces a mass flow of concentrated acidic liquid flavoring of 1.0-1.5 g/s.

18. The method of claim 17, wherein the jet of concentrated acidic liquid flavoring is dispensed for 0.3-3 seconds.

19. The method of claim 16, wherein the concentrated acidic liquid flavoring is dispensed into the beverage to dilute the concentrated acidic liquid flavoring by a factor of about 40 to about 160 times.

* * * * *